(12) United States Patent
Burchetta et al.

(10) Patent No.: US 8,150,774 B2
(45) Date of Patent: Apr. 3, 2012

(54) SYSTEM AND METHOD FOR PROVIDING AUTOMATED DISPUTE RESOLUTION BETWEEN OR AMONG MULTIPLE PARTIES

(75) Inventors: James D. Burchetta, New York, NY (US); Charles S. Brofman, Waccabuc, NY (US)

(73) Assignee: Cybersettle Holdings, Inc., White Plains, NY (US)

( * ) Notice: Subject to any disclaimer, the term of this patent is extended or adjusted under 35 U.S.C. 154(b) by 1060 days.

(21) Appl. No.: 11/981,272

(22) Filed: Oct. 30, 2007

(65) Prior Publication Data
US 2008/0140582 A1    Jun. 12, 2008

Related U.S. Application Data

(63) Continuation-in-part of application No. 11/224,155, filed on Sep. 12, 2005, which is a continuation-in-part of application No. 10/683,819, filed on Oct. 10, 2003, now Pat. No. 7,249,114, which is a continuation-in-part of application No. 09/370,394, filed on Aug. 6, 1999, now Pat. No. 6,954,741, which is a continuation-in-part of application No. 09/130,154, filed on Aug. 6, 1998, now Pat. No. 6,330,551.

(51) Int. Cl.
G06Q 50/00    (2012.01)
G06Q 20/00    (2012.01)
(52) U.S. Cl. ....................................... 705/80
(58) Field of Classification Search ............... 705/1, 4, 705/37, 80, 500, 1.1, 26.3
See application file for complete search history.

(56) References Cited

U.S. PATENT DOCUMENTS

| | | | | |
|---|---|---|---|---|
| 3,573,747 A | 4/1971 | Adams et al. | ................... | 705/37 |
| 3,581,072 A | 5/1971 | Nymeyer | .................. | 705/37 |
| 5,077,665 A | 12/1991 | Silverman et al. | .............. | 705/37 |
| 5,329,589 A | 7/1994 | Fraser et al. | ............... | 379/91.02 |
| 5,495,412 A | 2/1996 | Thiessen | .......................... | 705/1 |
| 5,508,912 A | 4/1996 | Schneiderman | .................. | 705/3 |
| 5,668,953 A | 9/1997 | Sloo | ................................. | 705/1 |
| 5,689,652 A | 11/1997 | Lupien et al. | ................... | 705/37 |
| 5,699,089 A | 12/1997 | Murray | .......................... | 715/823 |
| 5,764,890 A | 6/1998 | Glasser et al. | ................... | 726/11 |
| 5,781,901 A | 7/1998 | Kuzma | .................................. | 1/1 |
| 5,794,207 A | 8/1998 | Walker et al. | ..................... | 705/1 |
| 5,890,138 A | 3/1999 | Godin et al. | .................... | 705/26 |

(Continued)

FOREIGN PATENT DOCUMENTS

JP    2002-092376    3/2002

(Continued)

OTHER PUBLICATIONS

Anon., "American Bar Association Prepares for Year 2000 Bug," Knight-Ridder Tribune Business News (San Jose Mercury News—California), Jul. 19, 1999.*

(Continued)

*Primary Examiner* — Nicholas D Rosen
(74) *Attorney, Agent, or Firm* — William S. Frommer; Brian M. McGuire; Frommer Lawrence & Haug LLP

(57) ABSTRACT

A computer executable system and method for dispute resolution which includes the ability to resolve claims between or among multiple parties.

52 Claims, 11 Drawing Sheets

U.S. PATENT DOCUMENTS

| | | | |
|---|---|---|---|
| 5,895,450 A | 4/1999 | Sloo | 705/1 |
| 5,905,975 A | 5/1999 | Ausubel | 705/37 |
| 5,924,082 A | 7/1999 | Silverman et al. | 705/37 |
| 5,937,048 A | 8/1999 | Pelle | 379/201.12 |
| 5,956,687 A | 9/1999 | Wamsley et al. | 705/1 |
| 5,970,472 A | 10/1999 | Allsop et al. | 705/26 |
| 5,983,205 A | 11/1999 | Brams et al. | 705/37 |
| 6,052,674 A | 4/2000 | Zervides et al. | 705/40 |
| 6,064,981 A | 5/2000 | Barni et al. | 705/26 |
| 6,078,898 A | 6/2000 | Davis et al. | 705/19 |
| 6,112,181 A | 8/2000 | Shear et al. | 705/1 |
| 6,112,189 A * | 8/2000 | Rickard et al. | 705/36 R |
| 6,131,087 A | 10/2000 | Luke et al. | 705/26 |
| 6,141,653 A | 10/2000 | Conklin et al. | 705/80 |
| 6,208,973 B1 | 3/2001 | Boyer et al. | 705/2 |
| 6,243,691 B1 | 6/2001 | Fisher et al. | 705/37 |
| 6,285,987 B1 | 9/2001 | Roth et al. | 705/27 |
| 6,330,551 B1 | 12/2001 | Burchetta et al. | 705/80 |
| 6,343,271 B1 | 1/2002 | Peterson et al. | 705/4 |
| 6,366,925 B1 | 4/2002 | Meltzer et al. | 705/1 |
| 6,401,080 B1 | 6/2002 | Bigus et al. | 705/37 |
| 6,847,935 B1 | 1/2005 | Solomon et al. | 705/14 |
| 6,954,741 B1 | 10/2005 | Burchetta et al. | 705/80 |
| 7,177,836 B1 * | 2/2007 | German et al. | 705/40 |
| 7,249,114 B2 | 7/2007 | Burchetta et al. | 705/80 |
| 2001/0039527 A1 | 11/2001 | Ordish et al. | 705/37 |
| 2002/0007362 A1 | 1/2002 | Collins et al. | 707/5 |
| 2002/0091532 A1 | 7/2002 | Viets et al. | 705/1 |
| 2004/0210540 A1 | 10/2004 | Israel et al. | 705/80 |
| 2005/0203785 A1 | 9/2005 | Kixmiller | 705/7 |
| 2006/0080186 A1 | 4/2006 | Burchetta et al. | 705/26 |
| 2007/0106621 A1 | 5/2007 | Burchetta et al. | 705/80 |
| 2007/0150377 A1 | 6/2007 | Burchetta et al. | 705/27 |
| 2008/0065557 A1 | 3/2008 | Burchetta et al. | 705/80 |
| 2008/0065558 A1 | 3/2008 | Burchetta et al. | 705/80 |
| 2008/0126266 A1 | 5/2008 | Burchetta et al. | 705/80 |
| 2008/0140582 A1 | 6/2008 | Burchetta et al. | 705/80 |

FOREIGN PATENT DOCUMENTS

| | | |
|---|---|---|
| JP | 2002-366788 | 12/2002 |
| WO | WO 97/04410 A1 | 2/1997 |
| WO | WO 97/15362 A1 | 5/1997 |
| WO | WO 00/68865 | 11/2000 |

OTHER PUBLICATIONS

Disposition: Vacated and Remanded; by Panel, Jul. 24, 2007.
Anon, "Sybase Adds Web-based Technical Support to its Customer Service," Presswire, Mar. 29, 1996.
Zeng, D.-Z. et al., "Double-offer Arbitration," Mathematical Social Sciences, vol. 31, No. 3, pp. 147-170, Jun. 1996.
Abstract from New York Times editorial, Tuesday, Jan. 8, 1985.
Hines, Bernard L., "Asbitration Spells Relief. (insurance settlements)," Best's Review—Property-Casualty Insurance Edition, vol. 86, p. 47, Jan. 1986.
Jackson, William, "Mediation Proposed for Securities Disputes," Business First-Columbus, vol. 9, No. 31, p. 4, Apr. 5, 1993.
Skrzycki, Cindy, "The Regulators: An Electric Negotiation—Modern Times: OSHA to Try Writing Rules in Cyberspace," The Washington Post, Financial Section, p. D1, Feb. 8, 1994.
Stephenson, Max, "Rescuing ADR from its Advances", Public Administration Review, vol. 55, No. 4, pp. 385-388, Jul./Aug. 1995.
Grob, K., and Schecter, P.L., "Discovering Opportunities in Alternative Dispute Resolution: A Step-by-Step Guide for Getting Involved," Outlook, vol. 62, No. 4, p. 18, Winter 1995.
Anon., "Online Courtroom Service Introduced for U.S. Disputes," Internet Business News, Jul. 1, 1996.
Robbins, Stuart, "Lowering the Cost of Doing Business through ADR," Distribution, vol. 96, No. 11, pp. 58-59, Oct. 1997.
Mandell, Janette, "Cyberspace Conflicts," Software Magazine, vol. 18, No. 4, p. 20, Mar. 1998.
Negussie, Mel, "How to Select a Mediator," Defense Counsel Journal, vol. 65, No. 2, pp. 256-261, Apr. 1998.
Mullins, R., "Mediation, Arbitration Venues Offer Corporate Litigants Justice-in-Time," Business Journal-Milwaukee, vol. 9, No. 39, p. S6, Jul. 4, 1992.
Schweber, Claudine, "Your Telephone May Be a Party Line: Mediation by Telephone," Mediation Quarterly, vol. 7, No. 2, pp. 191-195, Winter 1989.
Schneider Denenberg, Tia, "The Electronic Arbitrator," The Arbitration Journal, vol. 45, No. 1, pp. 48-52, Mar. 1990.
Arnold et al., "Patent Alternative Dispute Resolution Handbook," 1991.
Brams, Steven J. and Merrill III, Samuel, "Arbitration Procedures with the Possibility of Compromise," Control and Cybernetics, vol. 21, No. 1, pp. 131-149, 1991.
Thiessen, Ernest and Loucks, Daniel, "Computer Assisted Negotiation of Multi-Objective Water Resources Conflicts," Water Resources Bulletin, American Water Resources Associaton, vol. 28, No. 1, pp. 163-177, Feb. 1992.
Hill, Richard, "Will Cyberspace Use Cybercourts?," International Commercial Litigation, Issue 23, pp. 33-35, Oct. 1997.
Neal Yeend, Nancy, "Electronic Alternative Dispute Resolution System Design," Mediation Quarterly, vol. 11, No. 2, pp. 193-194, Winter 1993.
Shaw, et al., "Using Alternative Dispute Resolution in The Federal Government," 1993.
Macduff, Ian, "Flames on the Wires: Mediating from an Electronic Cottage," Negotiation Journal, vol. 10, No. 1, pp. 5-15, Jan. 1994.
Helie, John, "Conflict and Conflict Resolution on Electronic Networks", pp. 1-6, Jun. 1994.
SchWeber, Claudine, "The Use of Technology in Conflict Resolution," paper presented at the European Conference on Peacemaking and Conflict Resolution, Oct. 1994, San Sebastian, Spain.
Brams, Steven and Taylor, Alan, "Fair Division: From Cake-cutting to Dispute Resolution," published by Clark Boardman Callaghan, 1996.
Levin, Amanda, "Online Claim Settlement Services Hit The Net," The National Underwriter Company National Underwriter, Claims Services Review Section, Nov. 9, 1998.
The International Dictionary Applied Mathematics, Van Nostrand, Princeton, 1960, p. 593.
Zeng, D.-Z. et al., "Intrinsic Gap and Final-Double-Offer Arbitration," in IFAC Large Scale Systems (conference proceedings), 1992.
Online Ombuds Office Web site, http://aaron.sbs.umass.edu/center/ombuds/default.htm and description.html, Apr. 14, 2000.
Colen, F.H., "Proactive Patent Protection," High Technology Business, vol. 9, No. 8, p. 14, Sep.-Oct. 1989.
Low, "Mediation vs. Litigation: How You Can Cut Costs," Texas Banking, vol. 80, No. 5, pp. 8-9, May 1991.
Anon., "TitleIV—Judicial Reforms," Health Legislation and Regulation, vol. 20, No. 3, Jan. 19, 1994.
Anon., "Pru Settlement Stalls State ADR Plan," Insurance Regulator, vol. 8, No. 37, p. 1, Sep. 30, 1996.
Anon., "Pharmacists' Antitrust Class-Action Lawsuit Opens," Marketletter, Oct. 5, 1998.
Ferling, R. L., et al. "New Plans, New Policies," Best's Review—Life-Health Insurance Edition, vol. 92, No. 8, p. 85, Dec. 1991.
Lewthwaite, G.A., "Paying for Years of Pain," Baltimore Morning Sun, Final Edition, p. 2A, Apr. 22, 1997.
Attrino, "P-C Agents Issue Checkbook Claims," National Underwriter, vol. 102, No. 29, pp. 15, 18, Jul. 20, 1998.
Anon., "Consultation on Periodical Payments for Future Loss," M2 Presswire, Mar. 13, 2002.
Brandenburger, A. and Nalebuff, B., Web pages from Co-opetition Interactive, Settle Escrows, A Negotiation Tool, www.mayet.som.yale.edu/coopetition, and corresponding pages from the Internet Archiveal http://www.archive.org/, May 4, 1997.
Anon., "13 Alternatives to High Cost Litig. 147," Westlaw, Nov. 1995; 1995 CPR Institute for Dispute Resolution f/k/a Center for Public Resources/CPR Legal Program.
Dauer, et al., "Manual of Dispute Resoltuion, ADR Law and Practice," vol. 1, Ch. 1-13, Shepard's/McGraw-Hill, Inc. May 1994.
Grenig, Jay E., "West's® Legal Forms, vol. 26, Alternative Dispute Resolution," St. Paul, Minn. West Publishing Co. 1995.
Grenig, Jay E., "Alternative Dispute Resolution With Forms," 2d Ed., St. Paul, Minn. West Publishing Co. 1997.
Pryor, E.S., "After the Judgment," Virginia Law Review, vol. 88, No. 8, pp. 1757-1830, Dec. 2002.

Stevenson, R.L., "Treasure Island," Chapter 6, 1882, from http://www.gutenberg.org/dirs/1/2/120/120.txt.

Dell'Omo, G.G., "Wage Disputes in Interest Arbitration: Arbitrators Weigh the Criteria" (Abstract only), Arbitration Journal, vol. 44, No. 2, pp. 4-13, Jun. 1989.

Kleiman, M., "Financial Success," HP Professional, vol. 5, No. 8, p. 28, Aug. 1981.

Zack, J.G., "Resolution of Disputes; The Next Generation," Transactions of AACE International, pp. 50-54, 1997.

Ozdamar, L., et al., "A Flexible Heuristic for a Multi-Mode Capital Constrained Project Scheduling Problem with Probabilistic Cash Inflows" (Abstract), Computers and & Operations Research, vol. 24, No. 12, pp. 1187-1200, Dec. 1997.

Merriam-Webster's Collegiate Dictionary, tenth edition, p. 1228, 1997.

Anon., "Treasure Island—Wikipedia, the free encyclopedia," http://en.wikipedia.org/wiki/Treasure_Island, Apr. 1, 2010.

U.S. Appl. No. 10/683,821, Burchetta et al.
U.S. Appl. No. 11/224,155, Burchetta et al.
U.S. Appl. No. 11/981,469, Burchetta et al.
U.S. Appl. No. 11/549,443, Burchetta et al.
U.S. Appl. No. 11/981,246, Burchetta et al.
U.S. Appl. No. 11/981,268, Burchetta et al.
U.S. Appl. No. 11/981,272, Burchetta et al., Instant application.
U.S. Appl. No. 11/981,368, Burchetta et al.
U.S. Appl. No. 11/981,456, Burchetta et al.
U.S. Appl. No. 11/549,437, Burchetta et al.
U.S. Appl. No. 11/549,437, Amendment & Petition Oct. 14, 2009.
U.S. Appl. No. 11/549,437, Terminal Disclaimer Oct. 14, 2009.
U.S. Appl. No. 11/549,437, Amendment & Req for Rec Jan. 21, 2010.
U.S. Appl. No. 11/549,437, Final Rejection Apr. 6, 2010.
U.S. Appl. No. 11/549,417, Non-Final Office Aciton Feb. 23, 2009.
U.S. Appl. No. 11/549,417, Amendment & Req for Rec Oct. 14, 2009.
U.S. Appl. No. 11/549,417, Burchetta et al.
U.S. Appl. No. 11/284,155, Resp to Elect/Restrict Jan. 17, 2008.
U.S. Appl. No. 11/284,155, Non-Final Reject Apr. 3, 2008.
U.S. Appl. No. 11/284,155, Amend/Req for Recon Jul. 17, 2008.
U.S. Appl. No. 11/284,155, Non-Final Reject Nov. 3, 2008.
U.S. Appl. No. 11/284,155, Amend/Req for Recon Jan. 21, 2009.
U.S. Appl. No. 11/284,155, Notice of Allowance Apr. 24, 2009.
U.S. Appl. No. 10/683,821, Non-Final Rejection Sep. 8, 2005.
U.S. Appl. No. 10/683,821, Amend/Req for Recon Dec. 9, 2005.
U.S. Appl. No. 10/683,821, Final Rejection Jun. 15, 2006.
U.S. Appl. No. 10/683,821, Amend & RCE Oct. 16, 2006.
U.S. Appl. No. 10/683,821, Non-Final Reject May 18, 2007.
U.S. Appl. No. 10/683,821, Amend/Req for Recon Aug. 7, 2007.
U.S. Appl. No. 10/683,821, Non Responsive Amend Aug. 20, 2007.
U.S. Appl. No. 10/683,821, Amend/Req for Recon Sep. 13, 2007.
U.S. Appl. No. 10/683,821, Amend/Req for Recon Nov. 26, 2007.
U.S. Appl. No. 10/683,821, Sup Resp & Petition Dec. 13, 2007.
U.S. Appl. No. 10/683,821, Petition Decision Apr. 4, 2008.
U.S. Appl. No. 10/683,821, Sup Resp/Amend May 2, 2008.
U.S. Appl. No. 10/683,821, Final Rejection Jun. 9, 2009.
U.S. Appl. No. 10/683,821, Examiners Interview Dec. 8, 2009.
U.S. Appl. No. 10/683,821, Notice of Allowance Jan. 25, 2010.
U.S. Appl. No. 10/683,821, RCE & IDS Apr. 1, 2010.

Complaint against National Arbitration Forum, Inc. (Filing fee $150 receipt No. 326323,), filed by Cybersettle, Inc. (cw,) (Entered: Sep. 29, 2004).

Answer to Complaint, Seperate Defenses, Counterclaim against Cybersettle, Inc. by National Arbitration Forum, Inc. (Confoy, Karen (Entered: Jan. 12, 2005).

Claim Platiff's reply to Defendant's Counterclaims by Cybersettle, Inc., Cybersettle, Inc. (Lattimore, Jason) (Entered: Jan. 26, 2005).

Plaintiff's Answer to Counterclaim of Defendant by Cybersettle, Inc., (Latimore, Jason) (Entered: Jan. 27, 2005).

Motion for Leave to File a First Amended Complaint by Cybersettle, Inc., Cybersettle, Inc. (Attachments: Exhibits #1-#15 to Declaration (Weider, Douglas) (Entered: Oct. 27, 2005).

Response in Opposition re 16 Motion for Leave to File a First Amended Complaint filed by National Arbitration Forum, Inc., National Arbitration Forum, Inc., (Attachments; # 1 Declaration of Christopher E. Torkelson) (Torkelson, Christopher) (Entered; Nov. 7, 2005).

Reply to Response to Motion re 16 Motion for Leave to File a First Amended Complaint filed by Cybersettle, Inc. (Weider, Douglas (Entered; Nov. 18, 2005).

Motion to Strike National Arbitration Forum Inc.'s Defenses and Counterclaim that the '551 Patent is Obvious . . . (Weider, Douglas) (Entered; Dec. 7, 2005).

Delcaration of Brian M. McGuire te 25 Motion to Strike . . . (Weider, Douglas) (Entered; Dec. 7, 2005).

Amended Complaint (First) against National Arbitration Forum, Inc., National Arbitration Forum, Inc . . . (Weider, Douglas) (Entered; Dec. 16, 2005).

Response in Opposition re 25 Motion to Strike . . . (Torkelson, Christopher) (Entered: Jan. 10, 2006).

Brief (Reply) in Further Support of its Motion to Strike . . . (Weider, Douglas) (Entered: Jan. 12, 2006).

Answer to Amended Complaint Separate Defenses . . . (Confoy, Karen) (Entered: Jan. 13, 2006).

Order dismissing as 25 Motion to Strike & for partial summary judgment . . . Signed by Judge John J. hughes on Jan. 17, 2006. (ck) (Entered: Jan. 23, 2006).

Plantiff's Reply/ Answer to Counterclaim . . . (Weider, Douglas) (Entered; Jan. 24, 2006).

Stipulation by National Arbitration Forum, Inc . . . (Confoy, Karen) (Entered: Feb. 6, 2006).

Stipulation and Order of Dismissal . . . (Confoy, Karen) (Entered; Feb. 6, 2006).

Stipulation and Order dismissing w/ prejudice . . . Signed by Judge Mary L. Cooper on Feb. 8, 2006 (ck) (Entered: Feb. 8, 2006).

Motion for Summary Judgment of Infringement by Cybersettle, Inc . . . ((Weider, Douglas) (Entered: Mar. 24, 2006).

Motion for Summary Judgment Memorandum in Support of . . . (Weider, Douglas) (Entered: Mar. 24, 2006).

Declaration of Daniel A. Ladow re 46 Motion for Summary Judgment . . . (Weider, Douglas) (Entered: Mar. 24, 2006).

Brief in Support re 46 Motion for Summary Judgment of Infringement filed by Cybersettle, Inc.. (Weider, Douglas) (Entered: Mar. 30, 2006).

Reply to Response to Motion re 46 Motion . . . (Weider, Douglas) (Entered: Apr. 21, 2006).

Statement of Material Facts in Opposition re 56 Cross Motion for Summary Judgment . . . (Weider, Douglas) (Entered: Apr. 21, 2006).

Brief in Support re 56 Cross Motion for Summary Judgment . . . (Confoy, Karen) (Entered: Apr. 28, 2006).

Amended Document by National Arbitration Forum, Inc . . . (Confoy, Karen) (Entered: Apr. 28, 2006).

Memorandum Opinion re 46 Motion for Summary Judgment . . . Signed by Judge Mary L. Cooper on Nov. 9, 2006. (ck) (Entered: Nov. 9, 2006).

U.S. District Court, Dist. of NJ [LIVE] (Trenton); filed Sep. 24, 2004.

Fritsche, Hans "Transaction exposure management in international construction" 1994 American Association of Cost Engineers Transactions 1994 Transactions pp. INT8.1-INT8.8.

O Kelly, Eugene D "A checkup for your treasury policy " Sep./Oct. 1995 Financial Executive v11n5 pp. 40-44.

U.S. Appl. No. 11/981,272, Burchetta et al.
U.S. Appl. No. 11/614,775, Burchetta et al.
U.S. Appl. No. 11/614,775, filed May 11, 2009, Burchetta et al., Non-Final Office Action.
U.S. Appl. No. 11/614,775, filed Sep. 11, 2009, Burchetta et al., Amendment.
U.S. Appl. No. 11/614,775, filed Sep. 15, 2009, Burchetta et al., Interview Summary re Sep. 10, 2009.
U.S. Appl. No. 11/614,775, filed Nov. 2, 2009, Burchetta et al., Interview Summary re Oct. 27, 2009.
U.S. Appl. No. 11/614,775, filed Dec. 3, 2009, Burchetta et al., Prelim. Amd from U.S. Appl. No. 11/981,268.

U.S. Appl. No. 11/614,775, filed Dec. 14, 2009, Burchetta et al., Notice of Allowance and Interview Summary re Dec. 3, 2009.

*Apollo Enterprise Solutions* v. *Debt Resolve*; Case No. 8:2007cv00106; Filed Jan. 29, 2007; (C.D.Ca.) Docket #1 Complaint (from Exhibit A of Complaint in Dist. N.J. case, before).

*Debt Resolve, Inc.* v. *Apollo Enterprise Solutions, LLC*; Case No. 3:2007cv00103; Filed Jan. 8, 2007; .(Dist N.J.).*Debt Resolve, Inc.* v. *Apollo Enterprise Solutions, LLC*; Case No. 3:2007cv00103; Filed Jan. 8, 2007; .(Dist. N.J.). Docket #1 Complaint.

*Debt Resolve, Inc.* v. *Apollo Enterprise Solutions, L.L.C.*; Case No. 1:2007cv04531; Filed May 30, 2007; (SDNY). Docket #5 Answer and Counterclaim; Docket #13 Memo of Law in Support of Defendant's Motion for Summary Judgment of Patent Non-Infringement Including Statement of Facts and Exhibit 5 Deposition Transcript of C. Imrey, CEO of Appollo Enterprise Solution LLC; Docket #14 Debt Resolve'S Opposition to Appollo's Motion for Summary Judgment; Docket #28 Dismissal.

* cited by examiner

*Fig. 4A*

Your Case Settled for $10,000!!!
Settled in Round 1

Did you know that ... with

*Rapid Funds* you can get your client's funds on this settlement within 72 hours?

RapidFunds gets your money to you when you need it – now.
Get started with RapidFunds    Yes
I'd like to be contacted about RapidFunds.    Yes
Neither I nor my client is interested in using RapidFunds to accelerate the settlement proceeds.    Yes Settlement documents will be prepared and sent to you. Please complete and return along with your *TAX ID NUMBER* to:

Paul Wellstone
Fair Insurance
123 Fair Lane
Bloomington, Illinois 61704
Telephone: 309-766-4569

Your TAX ID NUMBER is UNKNOWN. Please provide it here.

Please note the following reference information for this Case:

Fig. 4B

We're Sorry, but your Case did not Settle
All Available Rounds have Elapsed.

We suggest that you enter three new demands for your opposition to respond to on a round by round basis. Over 50% of claims that did not settle during the initial three rounds of bidding and are Re-Entered do eventually settle online. Your opposition will be notified immediately of the renewed opportunity and the process will quickly start again.

Remember, your demands are never revealed so your position will remain uncompromised.

To Re-enter this case, please click on the button below:

[Re-Enter this]

If you do not wish to re-enter the case now, you can do so anytime by going to Re-Enter a Claim in the Claim Menu Bar and accessing Cybersettle Case ID #386289. You can initiate your own cases as well. Remember, there is no cost unless your case settles!

When your case does settle,

Rapid Funds can get the funds to you in 72 hours.

For more information, click on the RapidFunds tab below or call (914) 286-5619.

If you would like to contact your opposition in this case, use the information provided below.

Opposition Information
Paul Wellstone
Post Office Box 189
Janeville, Minnesota 56048
Telephone: 507-234-6866
schoi@testing.bak What Would You Like to Do Next?

Show me my list of pending Cybersettle cases

MULTIPLE DEFENDANTS PROCESS

| DEFENDANT | ROUND 1 (FULL LIABILITY, YOUR %) | ROUND 2 (FULL LIABILITY, YOUR %) | ROUND 3 (FULL LIABILITY, YOUR %) |
|---|---|---|---|
| 1 | $100,000 (25%) $25,000 | $120,000 (33%) $40,000 | $150,000 (33%) $50,000 |
| 2 | $100,000 (60%) $60,000 | $125,000 (80%) $100,000 | $150,000 (80%) $120,000 |
| 3 | $100,000 (20%) $20,000 | $100,000 (25%) $25,000 | $100,000 (30%) $30,000 |
| TOTAL OFFERS | $105,000 | $165,000 | $200,000 |
| DEMANDS | $500,000 | $200,000 | $180,000 |
| | NOT SETTLED | NOT SETTLED | SETTLED FOR $190,000 |

SYSTEM AND METHOD FOR PROVIDING AUTOMATED DISPUTE RESOLUTION BETWEEN OR AMONG MULTIPLE PARTIES

CROSS REFERENCE TO RELATED APPLICATIONS

This application is a continuation-in-part of application Ser. No. 11/224,155, filed Sep. 12, 2005, which is a continuation-in-part of application Ser. No. 10/683,819, filed Oct. 10, 2003, now U.S. Pat. No. 7,249,114, which is a continuation-in-part of application Ser. No. 09/370,394, filed Aug. 6, 1999, now U.S. Pat. No. 6,954,741, which is a continuation-in-part of application Ser. No. 09/130,154, now U.S. Pat. No. 6,330,551, filed Aug. 6, 1998, each of which are incorporated herein by reference in their entirety.

FIELD OF THE INVENTION

This invention relates generally to dispute resolution and the handling of proceeds therefrom, and more particularly to on-line automated dispute resolution among multiple adverse parties in a confidential environment.

BACKGROUND OF THE INVENTION

In recent years, more and more people have turned to Online Dispute Resolution (ODR) to settle disputes. One example is the pioneering success of Cybersettle, particularly noteworthy for instituting a low-cost and surprisingly effective apparatus and method for resolving disputes online. Online and automated settlement methods lend themselves to processing settlements and electronic settlement payments electronically, but it still can take weeks to months to process the payment of settlement proceeds; and in some cases there is an industry incentive to delay the payment of settlement proceeds.

What is needed inter alia is a system and method to settle disputes among multiple parties, as well as to shorten the time between settlement and a claimant's receipt of funds.

SUMMARY OF THE INVENTION

In one embodiment of the invention, there is a computer executable method for dispute resolution between or among multiple parties, the method which when executed on a computer comprising: receiving at least one demand from each one or more first parties for each claim of each first party; receiving at least one settlement offer from each one or more second parties for all or a portion of each first party's claim; preventing disclosure of the demands to all second parties and preventing disclosure of each settlement offer to all first parties; calculating differences between the demands and the settlement offers in rounds, each of the differences being calculated using the settlement offers or offers corresponding to the demand or demands; calculating the percentage each settlement offer represents of the total settlement offered by each second party in that round for each corresponding demand; if the total settlement offer or offers corresponding to the demand or demands fall within at least one predetermined criteria, calculating the percentage each second party will pay toward each corresponding demand, and transmitting a message to the parties that some or all of the claims are resolved; if the total settlement offers corresponding to demand or demands do not fall within at least one predetermined criteria for any claims, or transmitting a message to the parties that no claims have been resolved is the at least one predetermined criteria is met; and repeating the above steps on a round by round basis until at least one claim has been resolved or until the parties determine that no resolution can be achieved.

In another embodiment, the invention provides for a computer executable method for dispute resolution for one first party and two or more second parties.

In another embodiment, the invention provides for a computer executable method for dispute resolution for two or more first parties and one second party.

In another embodiment, the invention provides for two or more first parties and two or more second parties.

In another embodiment, the invention provides for a computer executable method for dispute resolution for a power round, wherein any party may request a power round which uses at least one different criterion from the preceding round.

In another embodiment, the invention provides for a computer executable method for dispute resolution wherein if a resolution is not reached as to all parties after a predetermined number of rounds, any party may request the issuance of a facilitating message to assist in resolution in the next round.

In another embodiment, the invention provides for a computer executable method for dispute resolution which includes the steps of transferring funds from each settlement offer or upon resolution of that party's claim to the party whose demand has been resolved.

In another embodiment, the invention provides for the steps of notifying the party on whose behalf funds are transferred and notifying the party receiving said funds that the funds are being transferred to that party.

In another embodiment, the invention provides for the steps of notifying the party on whose behalf funds are transferred and notifying the party receiving said funds that the funds are being transferred to that party for a fee to be paid for the transfer of funds.

In another embodiment, the invention provides for the steps of notifying the party on whose behalf funds are transferred and notifying the party receiving said funds that the funds are being transferred to that party for a fee to be paid through a computer.

In another embodiment, the invention provides that the funds transferred upon resolution are a discounted amount of the settlement offer upon which resolution was based.

In another embodiment, the invention provides that the funds are transferred in the form of an annuity.

In another embodiment, the invention provides that the funds are transferred in the form of a loan to the party or parties who have resolved their disputes.

In another embodiment, the invention provides for deducting a fee for providing the loan In another embodiment, the invention provides for (a) the first party submitting one demand in the first round and each second party submitting one settlement offer in the first round; (b) each settlement offer calculated as a percentage of the amount each second party believes is the appropriate settlement amount for all second parties; (c) if the total settlement amount falls within a predetermined settlement criteria (d) apportioning the total settlement between or among each second party according to the percentage that party's settlement proposal constitutes of its proportion of what it believes was the appropriate settlement amount for all second parties; and (e) that if the total settlement amount does not fall within the predetermined criterion to produce a settlement, repeating steps (a) through (d) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

In another embodiment, the invention provides for (a) the first party submitting two or three demands in the first round and each second party submitting one settlement offer in the first round; (b) each settlement offer being calculated as a percentage of the amount each second party believes is the appropriate settlement amount for all second parties; (c) if the total settlement amount falls within a predetermined settlement criteria then; (d) apportioning the total settlement between or among each second party according to the percentage that party's settlement proposal constitutes of its proportion of what it believes was the appropriate settlement amount for all second parties; and (e) if the total settlement amount does not fall within the predetermined criterion to produce a settlement, repeating steps (a) through (d) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

In another embodiment, the invention provides for (a) the first party submitting one demand in the first round and each second party submitting two or three settlement offers in the first round; (b) each settlement offer is calculated as a percentage of the amount each second party believes is the appropriate settlement amount for all second parties; (c) if the total settlement amount falls within a predetermined settlement criteria then; (d) apportioning the total settlement between or among each second party according to the percentage that party's settlement proposal constitutes of its proportion of what it believes was the appropriate settlement amount for all second parties; and (e) if the total settlement amount does not fall within the predetermined criterion to produce a settlement, repeating steps (a) through (d) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

In another embodiment, the invention provides for (a) each first party submitting one demand in the first round and the second party submitting one settlement offer for each demand in the first round; (b) calculating the differences, if any, between each settlement offer and each corresponding demand to determine if any fall within a predetermined criterion; (c) any demand and offer which fall within a predetermined criterion results in a resolution of that demand; and (d) if any demand and offer do not fall within a predetermined criterion such as to result in a resolution repeating steps (a) through (d) on a round by round basis the same or different predetermined criterion until (i) a complete resolution of all demands is achieved, (ii) a predetermined number of rounds is completed, or (iii) at least one party concludes no resolution can be achieved.

In another embodiment, the invention provides for (a) each first party submitting two or three demands in the first round and the second party submitting one settlement offer to each first party in the first round; (b) calculating the differences, if any, between each settlement offer and each corresponding demand to determine if any fall within a predetermined criterion; (c) any demand and offer which fall within a predetermined criterion results in a resolution of that demand; and (d) if any demand and offer do not fall within a predetermined criterion such as to result in a resolution repeating steps (a) through (d) on a round by round basis the same or different predetermined criterion until (i) a complete resolution of all demands is achieved, (ii) a predetermined number of rounds is completed, or (iii) at least one party concludes no resolution can be achieved.

In another embodiment, the invention provides for (a) each first party submitting one demand in the first round and the second party submits two or three settlement offers for each demand in the first round; (b) calculating the differences, if any, between each settlement offer and each corresponding demand to determine if any fall within a predetermined criterion; (c) any demand and offer which fall within a predetermined criterion results in a resolution of that demand; and (d) if any demand and offer do not fall within a predetermined criterion such as to result in a resolution repeating steps (a) through (d) on a round by round basis the same or different predetermined criterion until (i) a complete resolution of all demands is achieved, (ii) a predetermined number of rounds is completed, or (iii) at least one party concludes no resolution can be achieved.

In another embodiment of the invention, the invention provides that where there is one first party and three second parties, a computer executable method for dispute resolution between or among multiple parties, the method which when executed on a computer comprising: receiving at least one demand from each one or more first parties for each claim of each first party; receiving at least one settlement offer from each one or more second parties for all or a portion of each first party's claim; preventing disclosure of the demands to all second parties and preventing disclosure of each settlement offer to all first parties; calculating differences between the demands and the settlement offers in rounds, each of the differences being calculated using the settlement offers or offers corresponding to the demand or demands; calculating the percentage each settlement offer represents of the total settlement offered by each second party in that round for each corresponding demand; if the total settlement offer or offers corresponding to the demand or demands fall within at least one predetermined criterion, calculating the percentage each second party will pay toward each corresponding demand, and transmitting a message to the parties that some or all of the claims are resolved if the total settlement offers corresponding to demand or demands do not fall within at least one predetermined criterion for any claims, transmitting a message to the parties that no claims have been resolved; and repeating the above steps on a round by round basis until at least one claim has been resolved or until the parties determine that no resolution can be achieved.

In another embodiment, the invention provides that where there is one first party and three second parties the first party submits a demand and the three second parties each submit an offer representing what each believes its share is of the total value of the demand; each second party's offer is calculated as a percentage of what that party believes is the value of the demand; performing a calculation to determine if the aggregate of the second parties' offers falls with a predetermined criterion for resolution of the first party's demand; if that is the case, all parties are notified if a resolution has been achieved; each second party then pays a percentage of the total demand equivalent to the percentage its offer bore to the value that party assigned to its portion of the demand; if a complete resolution is not achieved, further rounds of demands and offers are conducted until: (i) a complete resolution is achieved; (ii) a predetermined number of rounds has been completed; or (iii) all parties decide not to participate further.

In another embodiment, the invention provides that where there is one first party and two or more second parties (a) the first party submits two or three demands in the first round and each second party submits one settlement offer in the first round; (b) each settlement offer is calculated as a percentage of the amount each second party believes is the appropriate settlement amount for all second parties; (c) if the total settlement amount falls within a predetermined settlement criteria then; (d) apportioning the total settlement between or among each second party according to the percentage that party's settlement proposal constitutes of its proportion of what it believes was the appropriate settlement amount for all second parties; (e) if the total settlement amount does not fall within the predetermined criterion to produce a settlement, repeating steps (a) through (d) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

In another embodiment, the invention provides that where there is one first party and two or more second parties (a) the first party submits one demand in the first round and each second party submits two or three settlement offers in the first round; (b) each settlement offer is calculated as a percentage of the amount each second party believes is the appropriate settlement amount for all second parties; (c) if the total settlement amount falls within a predetermined settlement criteria then; (d) apportioning the total settlement between or among each second party according to the percentage that party's settlement proposal constitutes of its proportion of what it believes was the appropriate settlement amount for all second parties; (e) if the total settlement amount does not fall within the predetermined criterion to produce a settlement, repeating steps (a) through (d) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

In another embodiment, the invention provides that if one or two of the three parties decide not to participate further, the remaining parties can continue round by round to attempt to resolve the demand as it relates to that settlement party.

In another embodiment, the invention provides that if there are at least two rounds a computer executable method for dispute resolution between or among multiple parties, the method which when executed on a computer comprising: receiving at least one demand from each one or more first parties for each claim of each first party; receiving at least one settlement offer from each one or more second parties for all or a portion of each first party's claim; preventing disclosure of the demands to all second parties and preventing disclosure of each settlement offer to all first parties; calculating differences between the demands and the settlement offers in rounds, each of the differences being calculated using the settlement offers or offers corresponding to the demand or demands; calculating the percentage each settlement offer represents of the total settlement offered by each second party in that round for each corresponding demand; if the total settlement offer or offers corresponding to the demand or demands fall within at least one predetermined criterion, calculating the percentage each second party will pay toward each corresponding demand, and transmitting a message to the parties that some or all of the claims are resolved if the total settlement offers corresponding to demand or demands do not fall within at least one predetermined criterion for any claims, transmitting a message to the parties that no claims have been resolved; and repeating the above steps on a round by round basis until at least one claim has been resolved or until the parties determine that no resolution can be achieved.

In another embodiment, the invention provides a computer executable method for dispute resolution between or among multiple parties, the method which when executed on a computer comprising: receiving at least one demand from each one or more first parties for each claim of each first party; receiving at least one settlement offer from each one or more second parties for all or a portion of each first party's claim; preventing disclosure of the demands to all second parties and preventing disclosure of each settlement offer to all first parties; calculating differences between the demands and the settlement offers in rounds, each of the differences being calculated using the settlement offers or offers corresponding to the demand or demands; calculating the percentage each settlement offer represents of the total settlement offered by each second party in that round for each corresponding demand; if the total settlement offer or offers corresponding to the demand or demands fall within at least one predetermined criterion, calculating the percentage each second party will pay toward each corresponding demand, and transmitting a message to the parties that some or all of the claims are resolved if the total settlement offers corresponding to demand or demands do not fall within at least one predetermined criterion for any claims, transmitting a message to the parties that no claims have been resolved; and repeating the above steps on a round by round basis until at least one claim has been resolved or until the parties determine that no resolution can be achieved via the rounds conducted on the Internet.

In yet another embodiment, the invention provides a computer executable method for dispute resolution for the resolution of a class action where one each first party is a plaintiff and submits at least one demand and each second party is a defendant and submits one settlement offer for each demand of each first party it desires to resolve, said method comprising at least one round.

In yet another embodiment, the invention provides a computer executable method for dispute resolution wherein the at least one demand is received before the at least one offer.

In yet another embodiment, the invention provides a computer executable method for dispute resolution wherein the at least one offer is received before the at least one demand.

In yet another embodiment, the invention provides a computer executable method for dispute resolution wherein each first party submits two or three demands before each second party submits any offer In yet another embodiment, the invention provides a computer executable method for dispute resolution wherein each second party submits two or three offers before each first party submits any demand.

In yet another embodiment, the invention provides a computer executable method for dispute resolution wherein one of the parties can specify a maximum number of rounds. In one embodiment, the invention provides a computer executable method for dispute resolution with advance funding capability. The method, wherein any one of the following may be performed by at least one computer, comprises: receiving at least one demand from at least one first party for a claim; receiving at least one offer from at least one second party for the claim; preventing disclosure of the at least one demand to the second party, and preventing disclosure of the at least one offer to the first party; calculating a difference between the at least one demand and the at least one offer in at least one round; determining whether the difference falls within at least one criterion; resolving the claim if the difference falls within the at least one criterion, the claim remaining unresolved if the difference does not fall within the at least one criterion; receiving an authorization for at least one entity to accept a payment of proceeds from a resolved dispute in exchange for having funds provided to the first party; and transferring funds from the entity to the first party.

The invention also provides an electronic data processing system for providing a loan in anticipation of proceeds from a resolved dispute. In this embodiment, the invention comprises:

at least one programmable electronic data processor for executing programmed arithmetic and logical processes and storing data;

at least one input for receiving advanced funding data into said at least one electronic data processor;

at least one program, executable by said at least one electronic data processor, structured to process advanced funding data;

the at least one program, structured to establish at least one account; and the at least one program, structured to authorize payment of a dispute resolution payment loan amount via said account, whereby said payment is capable of being made prior to dispute resolution payment by said obligant.

In another embodiment, the invention provides a method of operating at least one programmable electronic data processing machine comprising:

receiving advanced funding data;

establishing at least one account related to said advanced funding data;

receiving authorization for payment via said account of a loan amount based on said advanced funding data prior to a dispute resolution payment by an obligant; and authorizing receipt by a loan creditor of an electronic transfer of payment to be applied against said loan amount;

wherein any one or more of the steps are performed by the at least one programmable data processing machine.

The invention provides, in yet another embodiment, a computer executable method for dispute resolution. The method, wherein any one the following may be performed by at least one computer, comprises: receiving a claim into a system configured to resolve a dispute; resolving the claim using the system configured to resolve a dispute; receiving authorization for at least one entity to accept a payment of proceeds from a resolved dispute in exchange for providing funds to at least one first party; and transferring funds from the entity to the first party; whereby at least one of the steps is executed by a computer including a computer executable program structured to execute at least one of the steps.

In yet another embodiment, the invention provides an electronic data processing system for providing loans in anticipation of a payment pursuant to a resolved dispute comprising:

at least one computer comprising a processor for executing programmed arithmetic and logical processes and a memory for storing data;

at least one input for inputting advanced funding data to said at least one computer;

at least one computer program executable by said processor for processing advanced funding data and establishing at least one account;

the at least one computer program, executable by said at least one processor, further configured to receive, via an input, authorization to pay a dispute resolution payment loan amount via the account, whereby said payment is capable of being made prior to payment by said obligant pursuant to a resolved dispute.

Also provided by another embodiment of invention is an electronic data processing system for providing loans in anticipation of proceeds from a resolved dispute, comprising:

at least one computer comprising a processor for executing programmed arithmetic and logical processes and a memory for storing data;

at least one input for accepting advanced funding data into said computer; including dispute resolution data comprising a first value submitted on line by at least one first party; a second value submitted on line by at least one second party;

at least one computer program executable by said processor for processing dispute resolution data; said at least one computer executable program configured to accept a pair of values from adverse parties via the input and return a result via a result indicator based upon a mathematical comparison of the pair of values, the at least one program being further structured to provide a payment value for the claim to at least one of the adverse parties via an output when the result indicator indicates that at least one criterion is satisfied for at least one round;

the program being further structured to process advanced funding data and establish at least one account;

the program being further structured to receive authorization to pay a dispute resolution payment loan amount from said account, whereby said payment may be made prior to a payment of proceeds from a resolved dispute by an obligant.

In a further embodiment the invention provides a computer executable method for dispute resolution, wherein at least one step of the method can be executed by at least one computer including at least one program. The method comprises: accepting advanced funding data; receiving an authorization for at least one entity to accept a payment of proceeds from a resolved dispute in exchange for providing funds to at least one first party; transferring funds to the first party; and receiving the payment of proceeds to the entity from the party obligated to pay said proceeds under the terms of a dispute resolution agreement.

With the respect to the various embodiments of the invention described herein any one or more of the first party or parties and any one or more of the second party or parties can either separately or jointly with one another request the participation of a facilitator for the purpose of assisting the parties in resolving the dispute.

It is also a further embodiment of the present invention to enable payment to be made by one or more payors to one or more payees. The invention envisions various methods of payment such as, for example, payment in cash, payment by check, payment by wire transfer, payment by PayPal, payment through a credit card or the like. Included within the ambit of payments is payment by the payor through a suitable platform which allows the funds to be transferred into a format especially suitable to the recipient payee. Thus, for example, the payee could express a preference to receive a wire transfer while the payor may wish to make the payment via a credit card. Both parties can be accommodated according to the present invention by the payor making a payment through its credit card which through a suitable platform will in turn generate a payment from that credit card via wire transfer into the account of the payee.

In another embodiment of the present invention a system is provided which comprises an input for receiving at least one demand from each one or more parties for each claim of each first party and for receiving at least one settlement offer from each one or more second party for all or a portion of each first party's claim; the system includes means for preventing the disclosure of the demands to all second parties and preventing disclosure of each settlement offer to all first parties;

The system further includes means for calculating the differences between the demands and the settlement offers in rounds such that at least one criterion is present within said means such that the settlement offers or the offers corresponding to demands are compared to determine if they fall within at least one predetermined criterion;

Said system further provides means for calculating the percentage each second party would pay towards each corresponding demand and means for transmitting a message to the parties that some or all of the claims are resolved. If the total settlement offers corresponding to demand or demands fall within at least one predetermined criteria or any claim or transmitting a message to the parties that no claims have been resolved if the at least one predetermined criterion is not met; and said system being such that the above sequence of steps can be repeated on a round by round basis until at least one claim has been resolved or until the parties determine that no resolution can be achieved.

In other embodiments of the system inputs, processors and other means are provided in order to enable the system to execute each of the various method steps set forth in the various embodiments of the present invention.

DESCRIPTION OF THE DRAWINGS

FIGS. 4 to 4B show a flow chart and associated screen shots showing an exemplary embodiment of the computer executable method for dispute resolution with the capability of funding a settlement in advance of a resolved dispute payment by an obliged party.

FIG. 8 shows a sample round by round method according to the present invention wherein one plaintiff is able to ultimately settle with three defendants.

DETAILED DESCRIPTION OF THE INVENTION

The present invention is described below with reference to block diagrams and operational illustrations of methods and devices for automated dispute resolution. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
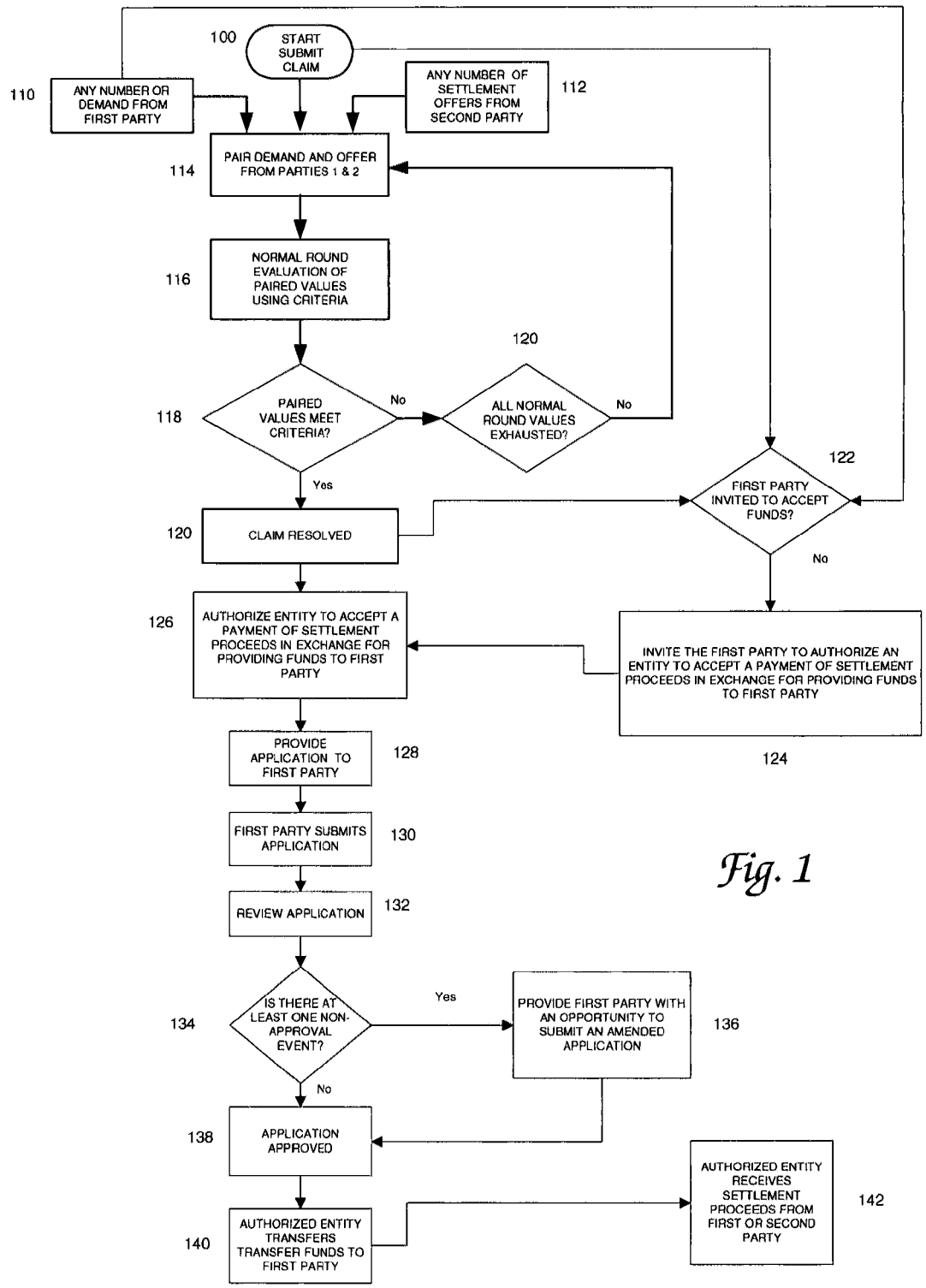
FIG. 1 is a flow chart showing one exemplary embodiment of the computer executable method for dispute resolution with advance funding capability.

FIG. 1 is a flow chart showing one exemplary embodiment of a computer executable method for dispute resolution with advance funding capability. A dispute is any contention, controversy, case, or claim between two or more parties, whether litigation is pending or not. Dispute resolution includes both the process and result of resolving the rights of the parties involved in the dispute. Examples of a resolved dispute include a settlement, a judicial order or verdict, or a simple withdrawal or failure to assert a claim, defense, or cause of action. While the invention is discussed throughout in terms of a settlement (e.g., settlement proceeds, settlement data, settlement payments, etc.); this description is merely illustrative of a resolved dispute, and does not limit the meaning of dispute resolution. The method begins by submission of a claim 100, as for example when at least one first party, for instance a claimant or claimant's agent (e.g., an attorney or arbitrator), submits a claim. A claim is simply an assertion of a right or perceived right, again regardless of whether litigation is pending. At least one first party, as used herein, may include any number of persons or entities in any relationship (e.g., claimant and agent) that has a right or potentially has a right as a function of the submitted claim or, including a right to a payment of proceeds, in part or in whole, when a claim is resolved. As used herein, the indefinite article "a" or "an" and the phrase "at least one" shall be considered, where applicable, to include within its meaning the singular and the plural, that is, "one or more". According to the Oxford English Dictionary, Second Ed., 1989, proceeds are broadly defined as "that which proceeds, is derived, or results from something; that which is obtained or gained by any transaction; produce, outcome, profit."

When the claim is received the first party can be invited 122 to authorize an entity to accept the payment of proceeds from the resolved dispute in exchange for having funds provided to the first party. Advance funding includes this type of agreement or understanding. Funds, as used herein, means money at a person's disposal—pecuniary resources. Funds also include any property of a like value that may be used to provide the value of pecuniary resources as well. The invitation can be presented or generated such that the first party receives it within about twenty-four hours of submission of the claim. The invitation can be delivered in any manner. For example, if the at least one first party comprises an attorney to whom the invitation was directed, the invitation could simply indicate to the first party that after settling the case, he or she choose to accelerate receipt of an attorney's fee, a client's proceeds, or the entire settlement. The invitation can be automatedly generated or offered in any number of ways, for example, the first party could be invited via at least one link accessible by an online user interface. A program can be written or adapted to send out a computer generated electronic mail message which is provided to the first party, or even to generate a print, meter and ready for delivery a hard copy correspondence to be sent via courier or mail upon submission of a claim online. The invitation could also take the form of a linked advertisement or even a graphic on a web page. The first party could also be contacted by telephone, for instance, either by personnel or via an automated telephonic interface which delivers pre-programmed or recorded invitations and touch-tone activated menus to allow the first party to respond.

The method can continue by the receipt of at least one demand from a first party for a claim 110 and at least one offer 112 from a second party for the claim. Here the second party can be a respondent, defendant, or any other party adverse to the first party with respect to the claim. A demand is the amount of money for which the party with the claim would be willing to resolve the dispute. For example, a claimant or his or her representative can enter information corresponding to the amount of the demand by using the numbers of a touch-tone or cellular telephone or by typing the numbers on the keyboard of a personal computer. An offer is the amount of money for which the second party will resolve the dispute. The invitation 122 may be offered as a function of any demand by the first party. When the demand and the offer are made, the method may be executed to prevent disclosure of the at least one demand to the second party, and preventing disclosure of the at least one offer to the first party. The difference between the at least one demand and the at least one offer are calculated in at least one round 114, each difference being calculated in a round 116 using one demand and one offer 116, the one demand and the one offer capable of being unequal in value. As it is possible for a demand and an offer to match, the difference can be calculated to be zero (0), which is to say a "difference" can include a mathematical difference of zero.

The method progresses to the step of determining whether any of the differences fall within at least one criterion 118. The claim is resolved if any of the differences fall within the at least one criterion, the claim remaining unresolved if the differences do not fall within the at least one criterion. This process can be repeated for any number of rounds, or, where the number or rounds are predetermined (e.g., three (3) rounds), until the rounds are exhausted 120. A description of a dispute resolution system and method that may be used to resolve a claim in at least one round can be found in the incorporated references U.S. patent application Ser. No. 10/683,819, U.S. patent application Ser. No. 09/370,394, and U.S. Pat. No. 6,330,551. When the claim is resolved, the first party may again be invited to accept the payment of settlement proceeds in exchange for providing funds to the first party 124.

Next comes accepting an authorization for an entity to accept a payment of proceeds from a resolved dispute (e.g., settlement proceeds) in exchange for having funds provided to the first party 126. This can be accomplished in myriad ways, for once the first party acknowledges that they intend to receive funds from a entity other than the party obligated to pay proceeds under the terms of a settlement or other resolved dispute, they are authorizing an entity to provide funds to the first party. The party obligated to pay proceeds from a resolved dispute, as used herein, refers to any party directly obligated, its agent, or any obligant party authorized to pay such proceeds. Examples of obligants authorized to pay such proceeds include, but are not limited to, the direct obligant, an attorney, a bank or other such financial institution, a broker, a trustee, an insurance company, or even a familial relative who volunteers to pay on behalf of a direct obligant. That is to say an obligant party may include any party that is authorized to pay the proceeds, regardless of whether the party has a direct obligation to do so or not. Proceeds from a resolved dispute include any monetary value or equivalent thereof (e.g. real or personal property, a service) that represents the value that one party is obligated to pay to another party as a function of the resolved dispute (e.g., a settlement agreement). Where the first party comprises an attorney or other agent, proceeds may be comprised of that agent's fees. The entity can also be authorized to accept a payment of proceeds that consists of the agent's fees, as opposed to the value of the entire resolved dispute.

Figure 5:
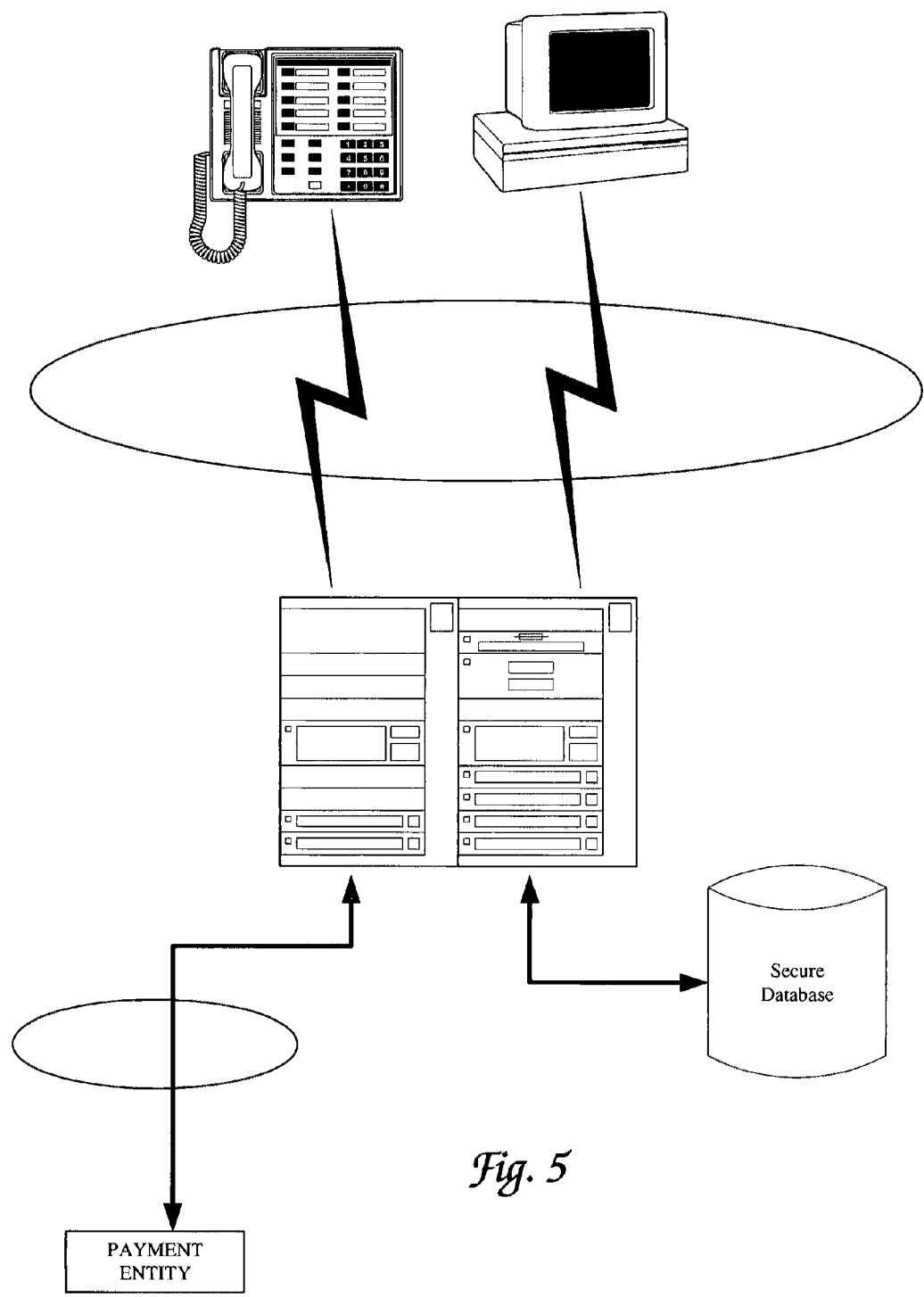

The quid pro quo for accepting the funds is that the first party will authorize the payment the proceeds over to at least one entity that is the beneficiary of that agreement. Such an agreement or understanding can take any number of forms, for example, the agreement could be a sale of the obligation to the beneficiary entity, or a loan to the first party. So long as the consideration for providing the funds to the first party is that the first party will authorize at least one entity to receive the settlement proceeds, it does not matter what form that authorization takes. Nor is it necessary that the entity providing the funds be the same as the entity who is authorized to accept payment of the settlement proceeds; having funds provided to the first party can include an arrangement where one entity is authorized to accept payment of the settlement proceeds, for example a service corporation (e.g., a online settlement provider), but another provides funds to the first party, as for example a financial intuition. So too, the at least one entity may be comprised of a) an entity that accepts authorization to accept a payment of settlement proceeds in exchange for providing funds, b) an entity that offers the advance funding option or maintains contact with the first party, or both or c) and an entity that provides the funds. All that is required is that at least one entity is authorized to accept a payment of settlement proceeds in exchange for having funds provided to the first party 126. Once the entity is authorized, the method allows for initiating a transfer of funds from the entity to the first party. FIG. 5 shows an exemplary simplified system variant, which includes an interface to effect payment to the party automatedly. Other non-limiting examples of a processing environments and networks involving financial institutions where such initiation can be carried out can be found in U.S. Pat. No. 5,193,057 to Longfield and U.S. Pat. No. 5,455,407 to Rosen, each of which are incorporated in their entirety herein.

The method goes forward by providing the first party with an application form to allow the first party to submit the application for the funds 128. The application can include information related to the resolved dispute, such as, for example the names, addresses, contact information and employment of the adverse parties to a settlement including their agents if any, the amount of the settlement, any outstanding liens or judgments on the parties to the transaction, social security numbers or other identification numbers. Once the first party attempts to complete the application the method turns to receiving a submission 130 of the application from the first party. Following submission, the application is subjected to a review 132 for at least one non-approval event 134; and if the application is in condition for acceptance, approving the application 138.

The review for at least one non-approval event 134 may have any number of targeted events which are searched for, with examples comprising, a search of the application form for requested information, a search for at least one lien that may attach to proceeds, a search for at least one bankruptcy filing, a search for at least one civil judgment, a search for attorney standing; or a search for a credit rating or other check for the status of an entity's or party's credit. Non-approval events also include the following: the first party comprises an attorney, and said attorney lacks good standing in the bar to which he is admitted; signature authority is not granted on the application; or the second party comprises a carrier in liquidation.

After subjecting the application for review, the method turns to determining if there is at least one non-approval event; and providing the first party the opportunity amend the application for the funds 136. A non-approval event will not necessarily or inevitably lead to non-approval of the application. As used herein, a non-approval event means an event or events that create a possibility that the application may in whole or in part fail to be approved. Whether a non-approval event, either alone or in combination with other such events, results in the non-approval of any part of the application depends upon the circumstances attending a given application.

As regards the method, the at least one non-approval event can comprise an incomplete application form. When the application form is reviewed to determine if all the requested information is present, if information other than required signatures is missing, the first party can be contacted either telephonically or electronically to obtain that information. An application review may also entail making sure that a copy of a signed release is present among the documents. It may also request a statement as to date sent. The submission of the application may be electronic. An electronically provided application form may comprise means to prevent the receiving of the submission of the application unless the form's requested information is complete. An electronic application may also be submitted using at least one digital signature. As such, even if a signature is missing, a party can be contacted via an automated electronic process to have the application form sent back electronically with a digital signature. Or the electronic application form can be configured such that it cannot be submitted without the requested digital signatures.

Where the application is reviewed to search for a non-approval event or events, a suitable electronic database may be accessed and searched to that end. For example, to search for at least one lien that may attach to the proceeds, a search for at least one bankruptcy filing, a search for at least one civil judgment, or a search for attorney standing, a suitable electronic database may accessed and searched to that end. An exemplary research database such as Westlaw® may be engaged to search for, inter alia, liens that may attach to the settlement proceeds. Westlaw®, a division of Thomson Corp. enables an entity to search over 1,900 public records databases including 50 state UCC, liens, civil judgment and bankruptcy filings as well as attorney standing records in less than five minutes.) Exemplary searches that can be utilized are "All Adverse—claimant and attorney" or "Professional Licenses—attorney". Such searches may be engaged using rules based programming or other automated processes that perform the search based on information provided in the application.

According to the method, a non-approval event or combination of events can result in approving the application such that the payment of settlement proceeds will consist of agent's fees (e.g., attorney's fees). In such a case, the method includes adjusting a discount of the funds provided to the first party, in this a case an agent, the discount being the discount from a value of the payment of proceeds. This is because the payment of proceeds is adjusted as a function of approving the application such that the payment of proceeds will consist of agent's fees. When the payment of proceeds is adjusted thus, it does not matter that an obligant may otherwise be obligated under the terms of a resolved dispute to pay proceeds in excess of the agent's fees, since it is the payment of proceeds that the entity provides funds in exchange for that is relevant for purposes of the application.

For example, if no liens are found, that portion of the application may be marked complete or satisfactory and the process can continue, but if liens are found, then an amended application may be completed and approved. The nature of the first entity as well as extant liens will be reasons to require amendment to the original application. One such example is the non-approval event where the first party comprises a claimant, and said claimant is legally incapacitated, for example, legally an infant, incompetent, or deceased. If the first party comprised a claimant who was a minor and an agent who was an attorney, the attorney would need to be notified that only his receivable can be funded. As another example, if the lien search revealed existing liens, the value of the funds to which a discount may be applied can be decreased in the amount of the owed liens.

Where there is an event that may serve to reduce the payment amount of the funds, in order to provide the first party with the opportunity to amend the application for the funds, the entity can itself make the appropriate change to the original application and secure the approval of the first party or its agent to this reduced amount. The amended application may contain the new reduced funding amount, the reason for the reduction, and signature spaces for first party or its agent, or both if both are participating in the funding transaction.

The method provides for initiating a transfer of funds from the at least one entity to the first party 140. The funds provided to the first party may be discounted from the value of the proceeds. This would be the case where the funding entity discounted the funds so as to have the benefit of a fee for the service. The method also provides for confirming and recording the transfer of funds from the entity to the first party. The at least one entity, including an affiliate or agent of the entity, could confirm and record the transfer of funds for purposes of tracking them. The funds may be provided to the first party within about 72 hours of the authorization of the entity to provide the funds, for example, within about 72 hours of receiving the application from the first party.

The method in one embodiment comprises receiving the payment of settlement proceeds to the entity 142. The proceeds may come from either the first or the second party 142. According to the method, the entity could take payment from the first party by arranging for that party to send the proceeds as soon as the party received them. An example of an acceptable method of receiving payment includes a direct debit of an account assigned in the first party's name. Alternatively, the involved parties or entities could arrange for funds to be sent directly from the second party, for instance, the party obliged to pay under the terms of the settlement, or the party's agent, or an account of the obligant at a financial institution.

Figure 2:
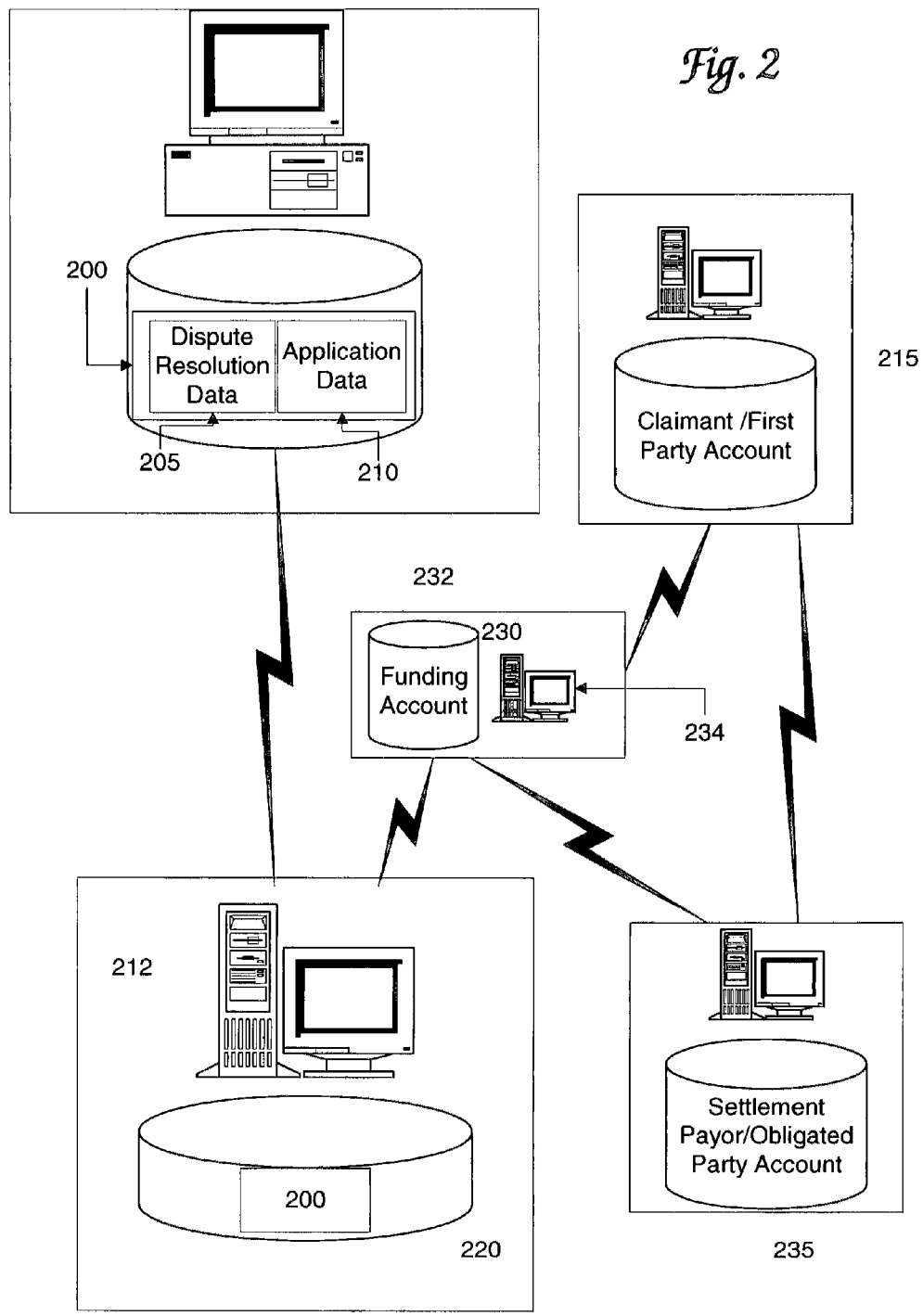
FIG. 2, FIG. 5 and FIG. 6 show embodiments of an electronic data processing systems and architecture for providing loans in anticipation of proceeds from a resolved dispute.
Figure 6:
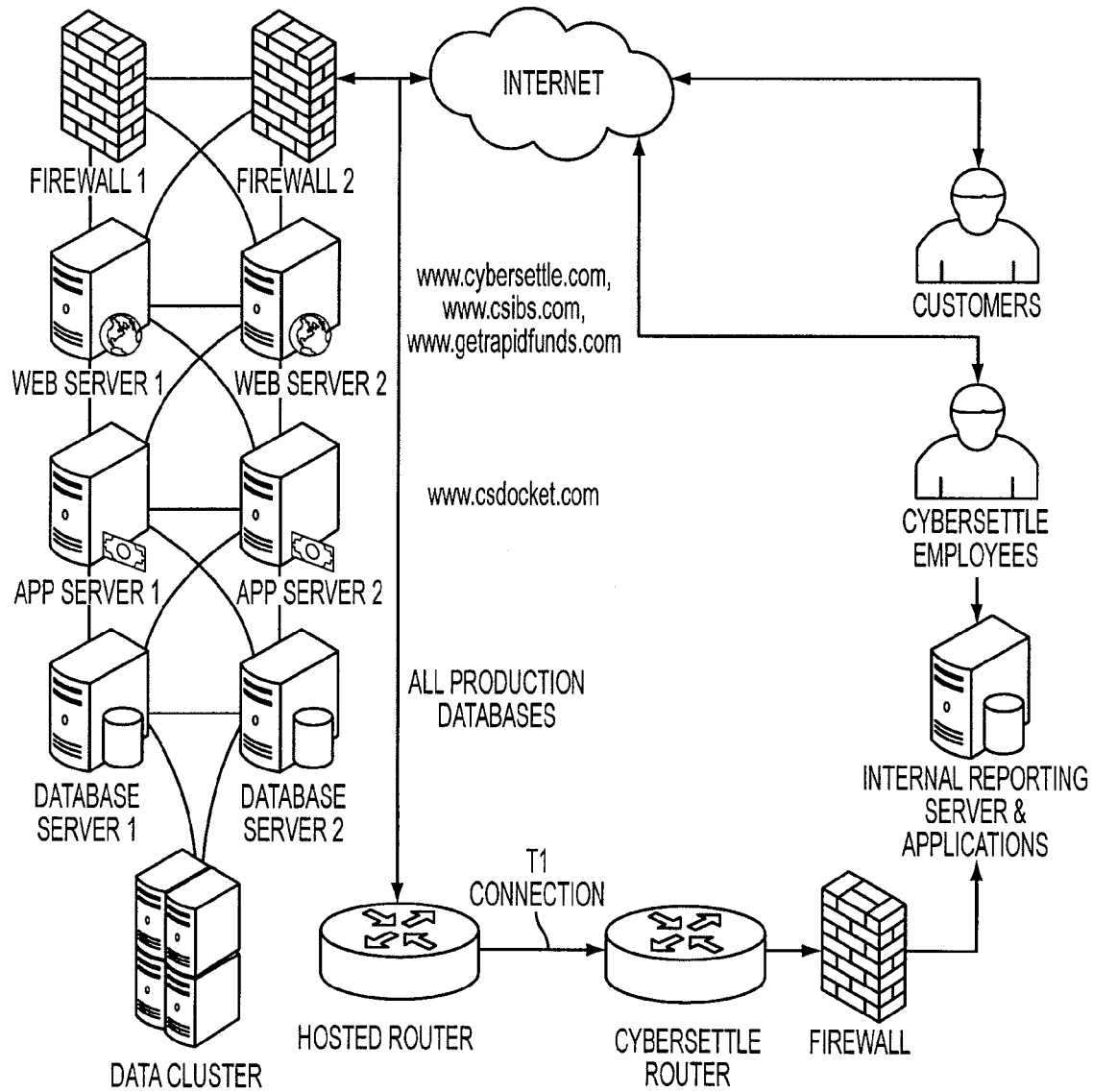
Figure 7A:
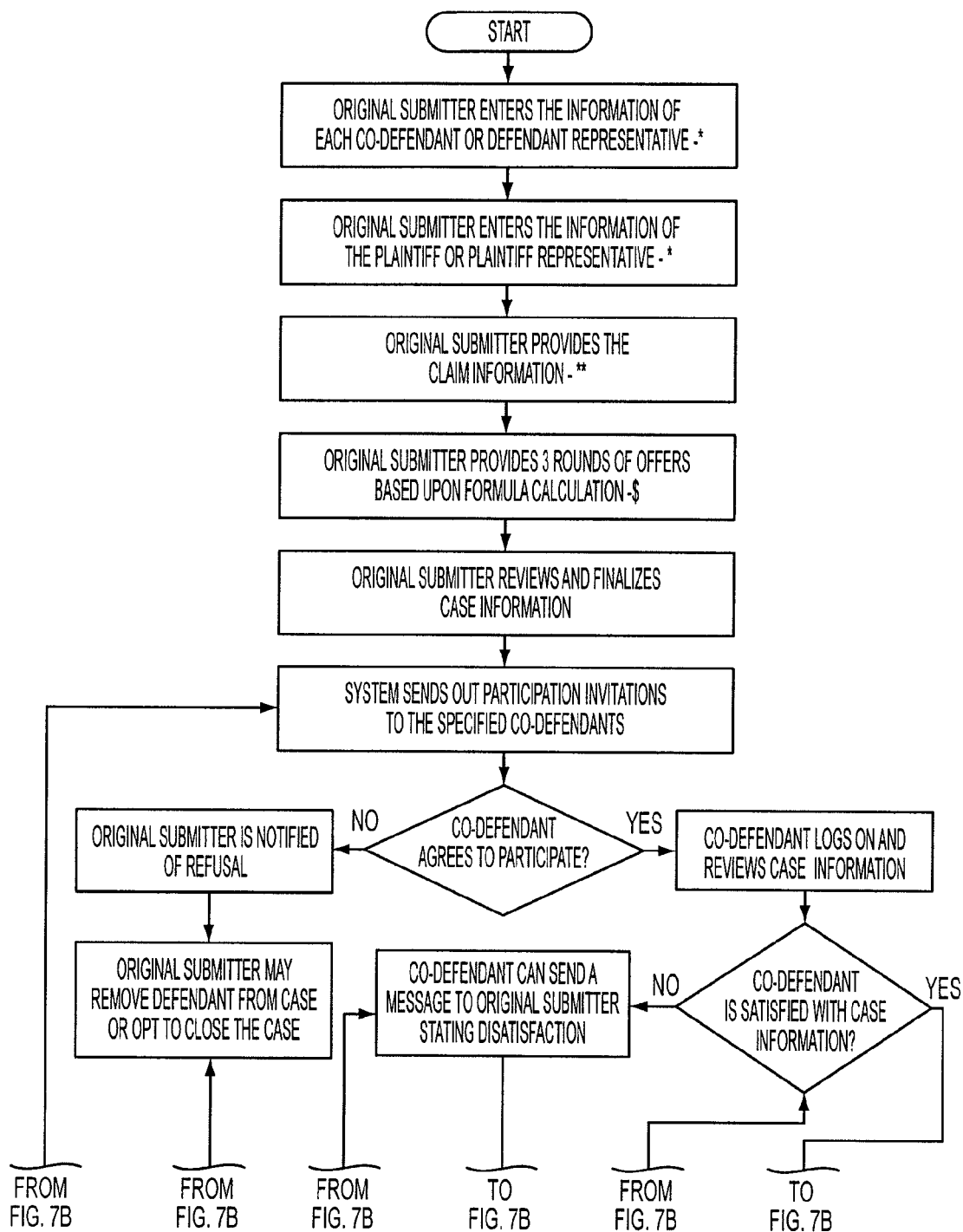
FIGS. 7A to 7B shows an embodiment of the present invention where a single plaintiff seeks automated settlement with multiple defendants. Similarly, multiple plaintiffs could seek settlement from a single defendant or multiple plaintiffs could seek settlement from multiple defendants.
Figure 7B:
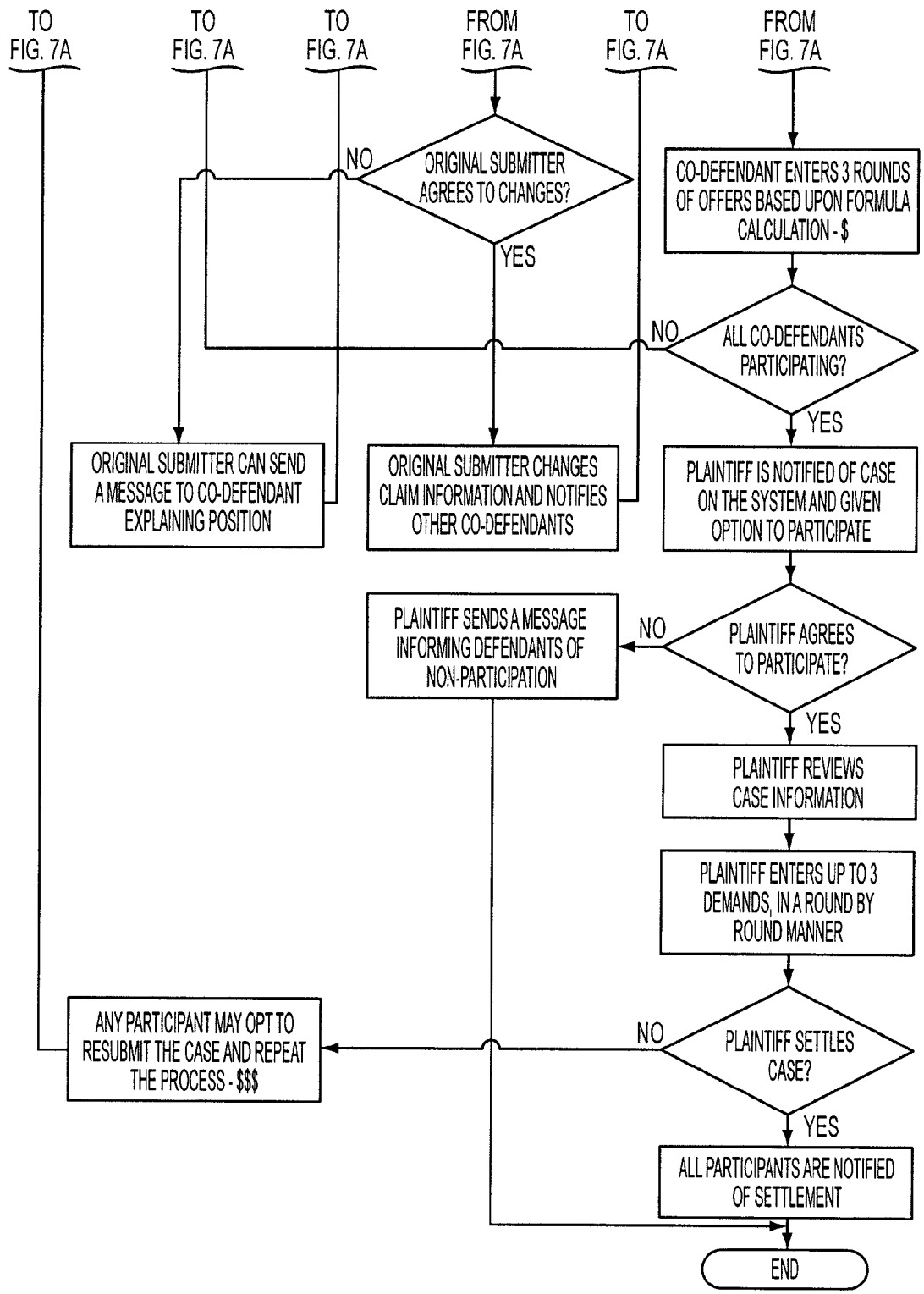

FIG. 2, FIG. 5 and FIG. 6 show embodiments of an electronic data processing system for providing a loan in anticipation of proceeds from a resolved dispute. A loan as defined herein, is intended to have its broadest possible meaning, and includes funds lent on the understanding that the proceeds from the resolved dispute (or a like value) will be given back in exchange, however it is not necessary that the proceeds actually be given in all cases. A loan may include, for instance, a sale of the right to collect proceeds from a resolved dispute, or a purchase of those proceeds at a discount. For example, the loan could be a non-recourse loan to a creditor party for a resolved dispute, in which case the lending entity would be without recourse against a funded party if the obligant of the resolved dispute did not pay the proceeds to the funded party or the lender. The exemplary system in the forthcoming description may be used to implement the invention disclosed herein, including any of the illustrative examples and embodiments, however the system in no way limits the invention as described and claimed. The electronic data processing system for authorizing dispute resolution payment loans comprises at least one programmable electronic data processing means for executing programmed arithmetic and logical processes and storing data. The selected platform and hardware to implement the system should be scalable enough to handle large loads of traffic and data, while being responsive to user requests. Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. Preferably, the application server is a popular platform in which to build applications of this type in order to support future changes, add-ons, modifications, etc.

The server preferably is an open architecture computer that has the ability for failed hardware parts to be replaced swiftly. This configuration also maintains the availability to increase the power of the machine or demand. For example, a computer having an Intel XEON 2.4 GHz Processor, a pair of 200 to 400 Gigabyte Hard Drives, a RAID Level 0 Controller or a RAID Level 5 Controller, a pair of switch networks, one being redundant, wherein a web server communicates with a database server, each network including a one gigabyte Ethernet card, is suitable for use in the system. Within a switch network, servers are load distributed.

The platform for use in the system preferably has the ability to work with open database systems, provide a reliable and scalable platform for Internet and line of business applications, and offer breed file and print services that give users easy and effective access to information and resources. For example, Microsoft Windows 2000 or 2003 and Intel Pro with a PC based Server ("Wintel") system, a powerful multipurpose server operating system, is a suitable platform because of its broad support of many application servers, its scalability to support the system of the present invention and its popularity with developers who create applications of this type. The platform can integrate the following services into underlying operating system infrastructure:

Built-in networking and communication services
Comprehensive Web services for the Internet and corporate intranets
Complete platform form for distributed applications
Enterprise-wide directory services
Integrated and robust security services
Easy-to-use and flexible management services.

The system of the present invention preferably uses a webserver, such as Microsoft Internet Information Server 6.0, that offers proven scalability and tight integration with the operating system and other products used in the system. The web server preferably includes publishing features, customizable tools, and technologies that permit the creation of Web pages, the publication of information to the World Wide Web, the sharing of files and data on operating systems such as Windows 2000, Linux or other open source operating systems, or UNIX servers, and over numerous databases, including Microsoft SQL Server 2000, oracle, and My SQL databases, and the search capacity for content in HyperText Markup Language and Microsoft Office document types, and multiple languages.

Preferably, the webserver offers process isolation, a feature which protects applications and Web sites from failure caused by misbehaving components or Web-applications on the server by running them in separate memory spaces. The webserver should also have, when combined with the operating system, built-in distributed application services that automatically scale to serve thousands of simultaneous users.

Preferably, a high performance, open architecture, scalable database, such as Microsoft SQL Server 2000 or 2005, is used in the system.

In one arrangement, the computer program is preferably one which provides a scalable platform to deliver high performance Web applications with any major Web server on Windows or Solaris. An ASP.NET platform and its cooperating Language being a combination or VB.net and C# are suitable for use in developing the system.

In another arrangement, the computer program is preferably one that provides a scalable three-tiered platform to deliver high performance Web applications with any major Web server on Windows or Solaris. The front end is ASP.NET, the middle tier is a business layer written in VB.net and C#, and the back end is Microsoft SQL 2000 or 2005 Server.

Preferably, the system is hosted at a quality data center, such as a worldwide data center company that provides access to the Internet and monitors the servers to ensure that they are responding to Internet requests.

Other optional features include the use of different types of communications links (e.g., optical cables or wireless connections); distributed databases; state machines; combinations of secure and non-secure servers; distributed processing; or implementing certain options such as indicators or particular functions in hardware vs. in software and vice versa. Similarly, the principles may be implemented using different types of storage such as tape, solid state, optical, magneto-optical, etc., instead of, or in addition to those described herein.

The system preferably is designed to allow a user to communicate with the system through a standard PC computer and modem via the Internet. The system may also include a voice message system or voice message generator to allow a person communicating with the system to do so through a touch-tone or cell phone linkage or to guide the person in the use of the system. Security is preferably included to make the system inaccessible without entry of the proper information, for example, a case identification number identifying the dispute, a security code corresponding to the dispute, and a user security code corresponding to the dispute and identifying the user, the user being the party, i.e.: the person or representative thereof who is to be paid proceeds upon resolution of a dispute, for example, the attorney for a claimant. Communication and data transmission between parties and entities can take place via known media, from transmission via optical fiber to mail or courier, including the illustrative examples described herein.

Preferably, the computer is secure, for example by the implementation of a "firewall" or protective barrier against unauthorized traffic or the use of encryption technology, and may be password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card. Advantageously, if the smart card is used, certain embodiments will allow a settlement to be completed by direct transfer of funds onto the claimant's smart card.

The system includes at least one computer 212 including at least one input means into which it receives advanced funding data 200. Advanced funding data 200 can include dispute resolution (e.g., settlement) data 205 and loan application data 210 into said at least one computer 212 including at least one electronic data processor. Dispute resolution data 205 includes any data that relates to the resolved dispute. This includes a wide variety of data, such as values submitted by adverse parties to a dispute, the names of these parties or their agents or both, beneficiaries of a settlement, any addresses for these involved parties, the value of the proceeds from the resolved dispute, insurer and insurance data, litigation or case data, fees and costs related to the settlement, and so on. Thus the dispute resolution data could comprise, for example, a first value submitted on line by a first party; a second value submitted on line by a second party, the first value being inaccessible to the second party and the second value being inaccessible to the first party, the first value and the second value being different in magnitude from each other. Loan application 210 data refers to any data that would be useful or requested in applying for a loan, or any data flowing from an application for a loan. It is possible that dispute resolution data and loan application data can be the same data, as for example is the case with the name of the party applying for funds, or the value of the proceeds from the resolved dispute.

Also included in the system is at least one program, executable by the at least one data processor 212, structured to process advanced funding data 200 dispute resolution data 205 and loan application data 210. A program, as used herein, is intended to have its broadest meaning and includes any set of instructions that a computer understands or specific set of ordered operations for a computer to perform. The instructions in a computer program are include those in machine code, and include those written in a computer programming language and translated to machine code using a computer program called a compiler or an interpreter. The programming language may be a set of abbreviations for the machine code instructions—that is assembly language—and a program such as an assembler can be used to make the translation.

The program executable by said at least one data processor 212 can be structured to process advanced funding data 200 (e.g., loan application data 210) to establish an account 230. The account 230 can be established at a financial institution 232. The advanced funding data 200 may be stored in memory 220 in order to allow it to be processed. For example the processor 212 can process the advanced funding data 210, such as the loan application data 210, and transmit it to a financial institution 232 where the account 230 is to be established, or transmit it to a credit verification agency for a credit check of the party to received advanced finding. Since advanced funding data 200 can include both dispute resolution data 205 and loan application data 210, which may in certain instances be the same data, it is possible for advanced funding data 200 such as dispute resolution data 205 and loan application data 210 to be stored or transmitted as a single file or in a single-file format. Examples of an automated credit application system, which includes exemplary loan application data, can be found in U.S. Pat. No. 6,505,176, and U.S. Pat. No. 6,587,841, each of which is incorporated herein in its entirety.

Also included in the system is the program, executable by said at least one data processor 212, 234, which can be structured to authorize payment by said financial institution 232 of a dispute resolution payment loan amount from the account 230, whereby said payment may be made prior to payment of the resolved dispute by said obligant party. An account 230 can be established at an authorized financial institution 232 (e.g., bank, financial union, Savings and Loan Association, etc.) that issues payments of funds in advance of a dispute resolution payment. Such an account 230 can be established as a part of an existing account 230, or the account may be created anew. As used herein, a financial institution 232 includes any entity authorized to manage or administer an account 230 that that issues a payment of funds in advance of a dispute resolution. Thus it is possible that the same institution that initially receives the advanced funding data 200 also be the financial institution 232. Similarly, a program structured to authorize the payment of funds may be hosted from or run by at least one computer including from at least one processor 212, 234 controlled by a financial institution 232, an entity that handles dispute resolution, or any other party capable of authorizing the payment of funds. Non-limiting examples of a processing environments and networks involving financial institutions may be found in incorporated references U.S. Pat. No. 5,193,057 to Longfield and U.S. Pat. No. 5,455,407 to Rosen.

A financial institution 232, or any other loan creditor of the funding account 230, may be authorized to electronically receive funds from another account 215, 235 which holds the payment pursuant to the resolved dispute that is to be applied against the advanced funding, or a value representative thereof. The payment-holding account 215, 235 may be a loan recipient's account 215 or an obligant's/settlement payor's account 235. An obligant is one who is obligated, or who takes on the obligation, of a payment as a function of a resolved dispute, for example the payor of a settlement—whether or not the payor is obligated to do so. Examples include a debtor, an insurance company, a family member of a debtor or obliged party, an agent or attorney of the obliged party, and so on. The loan recipient includes the party who receives a loan amount in advance of payment of a resolved dispute, for example a claimant to a settled dispute, as discussed herein. Reference to the loan recipient or the obligant includes anyone acting on their behalf or otherwise empowered to represent or stand in the place of the respective parties. Such authorization could be included in the initial advanced funding data 200, or separately obtained and authorized by either the financial instruction 232 or a party in communication with a financial institution (e.g., a claimant or his or her bank, an obligant or his or her bank, the entity that arbitrated or mediated the resolved dispute, etc.) Also, the program may be structured to authorize receipt by said financial institution 232 of electronic funds transfer from an account controlled by the at least one obligant 235 or the loan recipient 215 (e.g., the loan application data 210 includes a legally valid consent that allows authorizes the financial institution 230 to electronically debit funds from an account controlled by an obligant 235 or the loan recipient 215 when he or she given the payment from the resolved dispute, which the program the electronically transmits to the financial institution 232 holding the advanced funding account 230.

The electronic data processing system also may include access to a system verifying payment capability or loan eligibility. For example, credit can be verified on the basis of the advanced funding data, including either the loan application data (e.g., the claimant's identity and credit history derived therefrom), the dispute resolution data (the amount of the settlement and any liens that may attach to an obligant's account), or both. Non-limiting examples of loan application data and systems, which can process data so as to verify loan eligibility, may be found in the automated credit application and verification systems in U.S. Pat. Nos. 6,505,176, and 6,587,841 each of which are incorporated herein in its entirety. Also, exemplary entities such as Equifax, TransUnion, Experian or Westlaw provide databases and services that allow for credit verification or issues impacting loan eligibility.

The electronic data processing system can further include the program structured to deduct processing fees from said dispute resolution payment loan amount and program. The program can also be programmed to discount the amount of funds that will be provided to a party based upon the expected proceeds flowing from a resolved dispute that will actually be advance-funded (e.g., where the proceeds to be funded consist of the attorney's fees).

Where the funds provided to a party is a loan in the form of a check issued by the financial institution, the check itself can contain the terms of the loan and indicate that those terms are accepted upon endorsement. For example, the check could indicate that the loan is a non-recourse loan.

The electronic data processing system for authorizing dispute resolution payment loans can be integrated or work in conjunction with a dispute resolution system or method. The data processing system can include dispute resolution data comprising a first value submitted on line by a first party; a second value submitted on line by a second party, the first value being inaccessible to the second party and the second value being inaccessible to the first party, the first value and the second value capable of being different in magnitude from each other. The programmable electronic data processor can comprise a proxy including an input, an output and a computer executable program, the program being structured to, when executing, accept a pair of values from adverse parties via the input and return a result indicator to the proxy based upon a mathematical comparison of the pair of values. The program can be further structured to provide a payment value for the claim to at least one of the adverse parties via the output when the result indicator indicates that at least one of the adverse parties that at least one predetermined criterion is satisfied for at least one round. This is one example of a dispute resolution system and method that can be used in the present invention. Other such systems are described in U.S. Pat. No. 6,330,551, U.S. Pat. No. 6,954,741, U.S. Pat. No. 6,850,918 and U.S. Pat. No. 7,249,114, each of which are incorporated in there entirety herein.

Another embodiment provides an electronic data processing system for authorizing dispute resolution payment loans. The system includes a computer comprising a processor for executing programmed arithmetic and logical processes and a memory for storing data. At least one input receives advanced funding data, which can include dispute resolution data and loan application data into the computer. Also included in the system is a computer program executable by the processor for processing advanced funding data such as dispute resolution data and loan application data. A program executable by said at least one data processor for processing advance finding data (e.g., loan application data) and establishing accounts at a financial institution can be included. Examples of automated credit application system, including loan application data information can again be found in the incorporated references U.S. Pat. No. 6,505,176, and U.S. Pat. No. 6,587,841.

Also included can be a program executable by said at least one data processor for processing and structured to authorize payment by the financial institution of a dispute resolution payment loan amount via said account whereby said payment may be made prior to dispute resolution payment by said obligant. Non-limiting examples of a programmed data processor at a financial institution can be found in U.S. Pat. No. 5,193,057, the entirety of which is incorporated herein in its entirety.

The invention provides for operating at least one programmable electronic data processing machine, comprising a computer program executable by said at least one data processor structured to authorize receipt by a loan creditor of electronic funds transfer of a value applied against the loan. For example, a financial institution may be authorized to electronically receive funds from an account. The account may be a loan recipient's account or an obligant's account. The program may be structured to authorize receipt by said financial institution of electronic funds transfer from an account controlled by the obligant or the loan recipient. Such authorization could be included in or along with the initial advanced funding data (e.g., with application data), or separately obtained and authorized by either the loan creditor (e.g., the financial institution) or a party in communication with the loan creditor.

Also included in the electronic data processing system is a computer program executable on the processor structured to deduct processing fees from said dispute resolution payment loan amount. Also, a program can be programmed to discount the amount of funds that will be provided to a party based upon the expected proceeds flowing from a resolved dispute that will actually be advance-funded (e.g., where the proceeds to be funded consist of the attorney's fees). Where the funds provided to a party is a loan in the form of a check issued by the financial institution, the check itself can contain the terms of the loan and indicated that those terms are accepted upon endorsement. For example, the check could indicate that the loan is a non-recourse loan.

The electronic data processing system can further include a verification system for verifying loan eligibility. Such verification can be on the basis of advance funding data (e.g., loan application data and said dispute resolution data). Verification can take place via any number of methods, for example, those outlined with respect to the application review discussed with respect to FIG. 1 and elsewhere herein. Non-limiting examples of loan application data and systems, which can process loan application data, may be found in the automated credit application and verification systems in the incorporated references U.S. Pat. Nos. 6,505,176, and 6,587,841.

In various embodiments, an electronic data processing system for authorizing dispute resolution payment loans can be integrated or work in conjunction with a dispute resolution system or method. The data processing system can include dispute resolution data comprising a first value submitted on line by a first party; a second value submitted on line by a second party, the first value being inaccessible to the second party and the second value being inaccessible to the first party, the first value and the second value capable of being different in magnitude from each other. At least one computer can comprise a proxy including an input, an output and a computer executable program, the program being structured to, when executing, accept a pair of values from adverse parties via the input and return a result indicator to the proxy based upon a mathematical comparison of the pair of values. The program can be further structured to provide a payment value for the claim to at least one of the adverse parties via the output when the result indicator indicates that at least one predetermined criterion is satisfied for at least one round. Other such systems are described in the following incorporated documents: U.S. Pat. No. 6,330,551, U.S. patent application Ser. No. 09/370,394, U.S. patent application Ser. No. 09/450,938, and U.S. patent application Ser. No. 10/683,819.

Another embodiment provides a method of operating at least one programmable electronic data processing machine comprising: receiving inputted advanced funding data, including dispute resolution data and loan application data; establishing an account related to said advanced funding data; and authorizing payment by a financial institution from said account of a loan amount based on said advanced funding data prior to completion of a dispute resolution payment by an obligant. The method can include authorizing receipt by said financial institution of an electronic transfer of a value applied to be against the loan. Any one of these actions can be performed by the programmable data processing machine.

The method further comprises deducting processing fees from said loan amount. Also included are receiving inputted dispute resolution data including one value provided by a first party and another value provided by a second party adverse to the first party with respect to a claim, the values in each pair of values capable of differing in magnitude from each other; analyzing pairs of values in at least one round according to a first criterion; and calculating a dispute resolution amount according to a specified formula using any one of the values as an input for the specified formula for specifying a payment to be made to resolve the claim.

Figure 3:
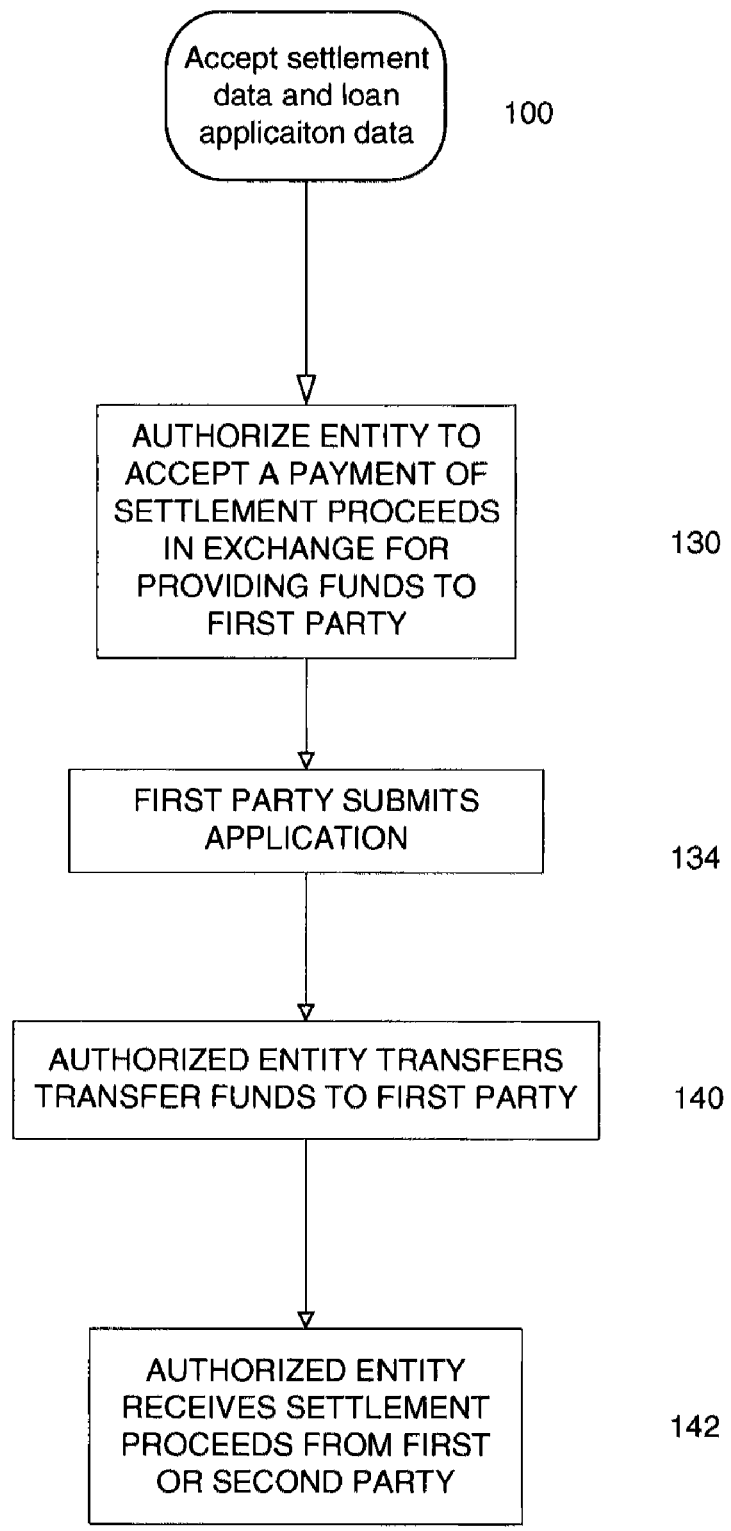
FIG. 3 is a flow chart showing yet another exemplary embodiment of the computer executable method for dispute resolution.

FIG. 3 is a flow chart showing yet another exemplary embodiment of the computer executable method for dispute resolution. The method begins by accepting advanced funding data, including dispute resolution data and loan application data 100. Next comes authorizing an entity to accept a payment of dispute resolution proceeds in exchange for having funds provided to at least one first party 130, as has been described in relation to FIG. 1, 126. As more fully explained at FIG. 1, all that is required is that an entity receives authorization to accept a payment of proceeds from a dispute resolution in exchange for having funds provided to the first party 126. Returning to FIG. 3, the method then allows for initiating a transfer of funds from the entity to the first party 140. The funds provided to the first party may be discounted from the value of the dispute resolution proceeds. Confirming and recording the transfer of funds from the entity to the first party may also be included in the method. The funds may also be provided to the first party within about 72 hours of authorizing the entity.

The method comprises receiving the payment of proceeds to the entity 142. The payment may come from either the first or the second party 142. According to the method, the authorized entity could take payment from the first party by arranging for that party to send the dispute resolution proceeds as soon as the party received them. An example of an acceptable method of receiving payment includes a direct debit of an account assigned in the first party's name. Alternatively, the involved parties or entities could arrange for funds to be sent directly from the second party (e.g., the party obliged to pay under the terms of the resolved dispute or its agent or representative.) According to the method, first party can be invited to authorize the entity to accept the payment of proceeds from a dispute resolution in exchange for providing funds to the first party. This includes generating an electronic correspondence and providing the correspondence to the first party. The inviting may be a function of receiving a submission of the claim; receiving any of a plurality of demands from the first party; or inviting the first party as a function of resolution of a claim. Inviting the first party as a function of receiving a submission of the claim may occur within about 24 hours of submission of the claim. The first party can be invited in many ways, including: inviting the first party via at least one link accessible by an online user interface, telephonically contacting the first party, inviting the first party via an automated telephonic interface; or generating correspondence and providing the correspondence to the first party via postal service. Again, the method of inviting the first party can take a myriad number of forms, as is more fully described in relation to FIG. 1.

The method further comprises providing the first party with an application form to allow the first party to submit an application for the funds, receiving a submission of the application from the first party 134, subjecting the application to a review for at least one non-approval event; and approving the application. The review may comprise a search of the application form for requested information, a search of at least one lien that may attach to settlement proceeds; a search of at least one bankruptcy filing; a search for at least one civil judgment; a search for attorney standing; or a search for a credit rating. Other non-approval events include an incomplete application form, the first party comprises an attorney that lacks good standing in the bar to which he is admitted; signature authority is not granted on the application; the first party comprises a claimant, and said claimant is legally incapacitated (e.g., an infant, incompetent, or deceased); or the second party comprises a carrier in liquidation. As before, a fuller description of non-approval events and their utilization in a computerized method of resolving a dispute can be found in FIG. 1.

Then the method moves to determining, after subjecting the application for review, that there is at least one non-approval event; and providing the first party the opportunity to submit an amended application for the funds. The application may be approved such that the payment of proceeds from a dispute resolution will consist of an agent's fees. When this occurs, a discount of the finds may be provided to the first party. This discount is from a value of the payment of proceeds, wherein said payment of proceeds is adjusted as a function of approving the application such that the payment of proceeds will consist of the agent's fees. It follows that that payment of proceeds may comprise the agent's fees or consist of the agent's fees.

In the method, the submission of the application may be electronic. An electronic application form may comprise means to prevent receiving of the submission of the application unless the application's requested information is complete. For example, an online application could have any number of required blank modules, which, if not filled out, will return an error message to an applicant upon an attempt to submit. An application can include at least one signature, which may be a digital signature.

The method comprises receiving the payment of proceeds to the authorized entity 142. The proceeds may come from either the first or the second party. According to the method, the authorized entity could take payment from the first party by arranging for that party to send the proceeds as soon as the party received them. An example of an acceptable method of receiving payment includes a direct debit of an account assigned in the first party's name. Alternatively, the involved parties or entities could arrange for funds to be sent directly from the second party, that is, the party obliged to pay under the terms of the settlement or its agent.

The method continues by the receipt of at least one demand from a first party for a claim and at least one offer from a second party for the claim. Here the second party can be a respondent, defendant, or any other party adverse to the first party with respect to the claim. The invitation may be offered as a function of any demand by the first party. When the demand and the offer are made, the method is may be executed to prevent disclosure of the at least one demand to the second party, and preventing disclosure of the at least one offer to the first party. The difference between the at least one demand and the at least one offer are calculated in at least one round, each difference being calculated in a round using one demand and one offer, the one demand and the one offer capable of being unequal in value, although they need not be, because a difference includes a mathematical difference of 0. The method progresses to determining whether any of the differences fall within at least one criterion. The claim is resolved if any of the differences fall within the at least one criterion, the claim remaining unresolved if the differences do not fall within the at least one criterion. This process can be repeated for any number of rounds, or, where the number or rounds are predetermined, until the rounds are exhausted. When the claim is settled, the first party may again be invited to accept the payment of proceeds in exchange for providing funds to the first party.

Figure 4:
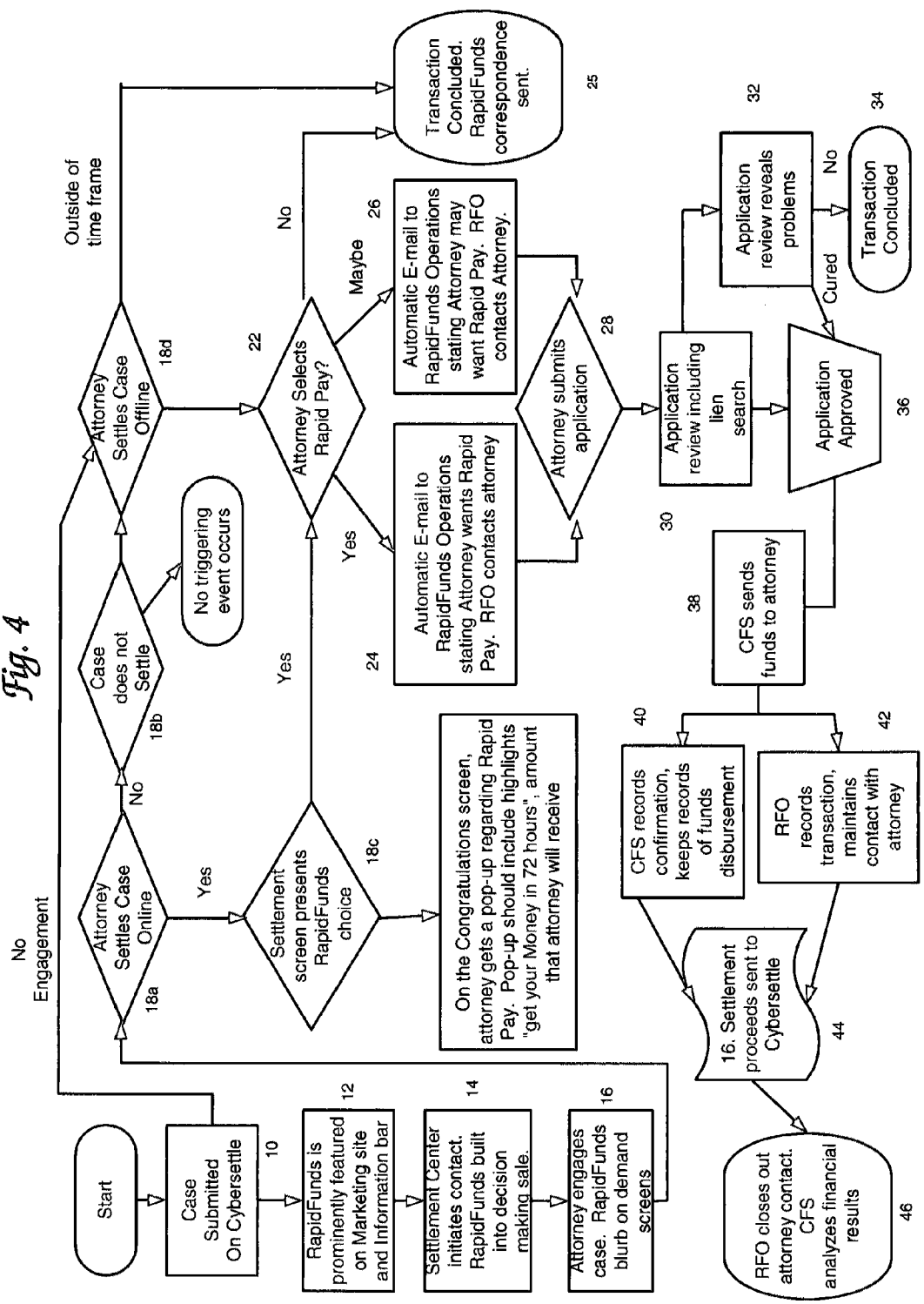

FIG. 4 is a flow chart showing an exemplary embodiment of the computer executable method for dispute resolution with the capability of funding a settlement in advance of a resolved dispute (e.g., a settlement) payment by an obliged party. The method begins with a claim submission 10. Claim submission 10 can generate correspondence, for example, an automated letter to the claimant's attorney. An attorney's first exposure to the advanced funding method may occur at this time. The correspondence can give instructions, fee schedule, and information regarding the funding system and method, indicating to the attorney that he or she may be able to receive funds in an accelerated time period. For instance, the correspondence may state: "From Settlement to Funds in 72 Hours. After settling your case, you may choose to accelerate receipt of your fee, your client's proceeds, or the entire settlement. RapidFunds allows you to put money in your pocket and in your client's hands faster than ever before. For more details, go to www.cybersettle.com and click on RapidFunds." Alternatively, or in addition, a link, graphic, or banner on a web page 12 could direct a user of an online dispute resolution system or other online entity to a website of the advanced funding system or a marketing site therefore. For example, the attorney who goes to an online dispute resolution system (e.g., www.cybersettle.com) will see a tab or box containing information similar to the above with link to further information, including an application for advanced funding using RapidFunds. The information may be in close proximity to the user login, or placed strategically in locations where a user involved in settling a case would be drawn to activate the link (e.g., an electronic docket of a party using the system to settle the case). It would highlight the advanced funding feature (e.g., cash in hand in 72 hours or less.)

Next the method provides for initiating contact 14 with a party who is potentially one that will be entitled a settlement award or payment as a function of resolving a dispute. For example, a "Settlement Center" can contact an attorney's office 24 hours after claim has been submitted to Cybersettle. When contact is had with the attorney or primary decision maker regarding the case, Settlement Center personnel will also mention the availability of advance funding (e.g., RapidFunds) when the case settles. For example, an electronic mail, an automated telephonic system, or even a simple telephone call by personnel could be scripted to state: "When you get the case settled, you and your client can have access to the settlement funds within 72 hours of completing the release with the RapidFunds service." The script could also indicate that the advanced funding would be for a nominal discount.

When the attorney engages online 16, a blurb advertising and linking the advance payment function may be featured at the bottom of each screen. The link could be used to allow the party to authorize the advance funding on the condition that the case or claim settles.

When the attorney settles a case online 18a, he or she is presented with a link, screen shot, or other such access or introduction to the advanced finding system or method. A system and method for online settlement is described in incorporated references U.S. Pat. No. 6,330,551, U.S. patent application Ser. No. 09/370,394, U.S. patent application Ser. No. 09/450,938, and U.S. patent application Ser. No. 10/683,819. For instance: "RapidFunds" could be featured directly below a Congratulations message which reads, "YES Your Case Settled for $10,000!!! Settled in Round 1(2 or 3) Did you know that with RapidFunds you can get your client's funds on this settlement within 72 hours? RapidFunds gets your money to you when you need it—now." An example of such a link or screen presenting the link is shown at FIG. 4A.

The linking message my then present the settling party the option to begin the advance funding immediately, or offer to contact the party at a later point. (e.g., "Get started with RapidFunds" and a link to and advance funding site labeled "Yes" or "I'd like to be contacted about RapidFunds" and a link or module labeled "Yes" which sends a signal to an operations center indicating that the party should be contacted.) Of course a link or module could also be provided to refuse the advance funding service, in which case activating the refusal will send a signal to an operations center or other such entity instructing it to generate a correspondence to promote or indicate the availability of the service. Such correspondence could be generated automatedly.

The settling party can be notified that settlement documents will be prepared and sent. A message asks that they be completed and returned along with a tax id number, if unknown, to the obliged party, for example an insurance company. An internal discount calculator may be integrated into the advance funding method, which would any number of factors into account when calculating a discounted funding amount, for example the nature of the payer (e.g., a carrier).

Settlement can take place online over the telephone, either in an automated dispute resolution system or even using traditional arbitration or mediation. Automated telephonic dispute resolution is described in the incorporated references U.S. Pat. No. 6,330,551, U.S. patent application Ser. No. 09/370,394, U.S. patent application Ser. No. 09/450,938, and U.S. patent application Ser. No. 10/683,819. For example, if the attorney settles online with personnel from a settlement service such as a Settlement Center, then the contact regarding the advance funding system and method may be verbally delivered by the Settlement Center. The Settlement Center personnel can then gauge initial interest and transfer the call to an operations center for the advance funding option for further assistance. These contacts could also be made via an automated system.

A settling party can use the advance funding system and method even if that party does not settle online, but settles offline 18b. For example, parties such as attorneys using an automated dispute resolution system may fail to resolve a dispute using that system or method. In that case, a notice of the advance funding option can appear on a "Not Settled" screen or in a notification of no settlement generated and sent to the attorneys (e.g., electronic mail, correspondence by post or courier, telephonic message). An example of such a screen is shown in FIG. 4B.

Similarly, an entity providing the advanced funding system or method could offer the option if it learns of offline settlement 18d. For example, if within 30 days of original submission an entity discovers or is informed of an offline settlement, the entity (e.g., RapidFunds Operations) may initiate contact with the attorney's office regarding the advance funding opportunity. This contact may be by email, fax, or telephone. If an entity (e.g., Settlement Center personnel) learn directly from an attorney that a case has settled offline, the Settlement Center may ask the attorney if there is interest in pursuing the advance funding option. If there is interest the call will be transferred to an entity that begins the advance funding process (e.g., RapidFunds Operations).

As noted above with respect to operational flow as shown at 16, the attorney is given the opportunity to indicate his interest in pursuing the advance funding option 24 If the attorney responds "Yes" to the inquiry, she will be brought to a screen that will allow her to immediately download an application for the advance funds. This screen will also advise her that the advance funding entity, or representative thereof (e.g., Rapid-Funds Operations) will be in touch with her to answer any questions that she may have.

If the attorney requests contact (e.g., indicates interest only), settles over the phone, or does not respond to the inquiry before closing out the screen, the funding entity, RapidFunds Operations, may receive an automated electronic mail regarding case settlement and the attorney's interest. RapidFunds Operations may then contact the attorney 26, either using personnel or using an automated system or method for contacting parties. As shown in the following non-limiting example, the following scripts may be used to engage a party, and could be programmed or recorded into an automated system.

Where the attorney engages a dispute resolution system, settles online, or otherwise engages the entity over an online system, a settlement page offers RapidFunds—RapidFunds Operations can attempt contact in every instance where there is a non-negative response. Upon contact the following scripts can be delivered:

"I am contacting you regarding settlement funds for your client X. With Rapid-Funds, your client can have his/her funds within 72 hours rather than waiting weeks." (Other selling points can be scripted.)

"Your client can receive settlement funds within 72 hours as opposed to up to 6 weeks."

If the attorney asks for more information, for instance by pressing a touch tone key upon being prompted by an automated telephonic interface with interactive capability, further scripts could recite:

"You don't have to wait for your receivable either. You can put your money back to work for you."

"Since your client will have received his or her settlement funds, your office won't have to deal with a client's frustration at the carrier's delay in payment."

If attorney says yes or asks how to authorize the advance funding 24, the script may say:

"All you have to do is fill out an application that I can fax to you or you can find online at www.cybersettle.com. When you have returned it to us, we'll set the ball rolling."

A script for an attorney's inquiry about fees may recite:

"We charge a fee because we assume the risk of carrier payment. If the settlement funds are delayed or are unpayable, it does not affect the funds that we forward to you. This is a nonrecourse transaction on our part. In this instance, you may receive up to $xxxx if the entire settlement is accelerated with RapidFunds."

Of course, any number of potential scripts and inquiry prompts could be programmed or used in the systems and methods described herein, of which the above are but a few examples.

In addition, it the attorney indicates that he is not interested in pursuing the advance funding option, neither the entity nor any agent or representative thereof, e.g., RapidFunds Operations nor the Settlement Center will contact the attorney regarding RapidFunds. The entity (Cybersettle Financial Services) will automatedly generate a hard copy letter and/or email 25 regarding the RapidFunds product to build goodwill for the next opportunity.

The method then can move to application intake by the entity 28. The application will direct the attorney to deliver the application to the entity. Along with manual transmission, this can be done by any form of electronic transmission, be it electronic mail, facsimile, fax-mail, via web-based interface, and so on. Certain electronic transmission may require a digital signature or other form of legal identity authentication. The entity can have onsite intake devices dedicated to dedicated to application intake, such as a dedicated fax machine, computer, etc. In this way, the entity can monitor the device and act immediately upon application receipt. Automation of intake and approval further increases the speed with which a party's application can be approved, which in turn quickens providing the party with funds.

An application review 30, which may be automated, is now described. At least one entity, RapidFunds Operations, first reviews the application to determine if all necessary information is present. An electronic application can be designed such that it cannot be submitted unless information deemed necessary is not provided by the applicant. For example, an application form that is submitted by filling in the form as presented via online modules, could be designed to return an error message if entered information is incorrect or if no information is given. The entity could also design programs or adapt devices to engage in an automated scan of applications for information, scanning being well known in the art. If a scan reveals information is missing other than required signatures, RapidFunds Operations can contact the attorney, either by a computer-generated electronic mail or telephonically, to obtain that information. Since the application review and the following contact can all be done via the automated processes described, it is possible for the application to be thus processed without a need for human discretion.

The application review can entail assuring that a copy of a signed release—or other such legally recognized document—is present among the documents. It may also be necessary to require a statement as to date sent. Again, as digital signatures or other legally recognized identity approval is possible (e.g., a biometric authentication), this part of the review may also be automated such that human discretion need not be involved.

RapidFunds Operations may also utilize a public or private database such as Westlaw® to search for liens that may attach to the settlement proceeds. Westlaw®, a division of Thomson Corp., enables the entity to search over 1,900 public records databases including 50 state UCC, liens, civil judgment and bankruptcy filings as well as attorney standing records in less than five minutes. In addition, specific searches that can be utilized are: "All Adverse—claimant and attorney" and "Professional Licenses—attorney." If no liens are found, that portion of the application review can be marked complete and the process will continue. As before, this entire process may be automated.

If any problems in the process occur as a function of the review 32, then the application may need to be amended. For example, if liens are found, then an amended application must be completed and approved. The nature of the claimant as well as extant liens will be reasons to require amendment to the originally proposed application. For instance, if the claimant is a minor and that was not clearly indicated during the settlement process (e.g. in the docket or case information), a message—including by automated communication—may be sent the attorney that only his receivable can be funded using the advance funding option. Also, this information may be prominently featured in the application instructions to minimize the occurrence of this situation. In another example, if the lien search reveals existing liens, the initial amount to which the discount is applied will need to be decreased in the amount of the owed liens.

Should any non-approval event occur which serves to reduce the payout amount, the entity may need to amend the original application and secure the approval of attorney and client to this reduced amount. The amended document will contain the new reduced funding amount, the reason for the reduction, and signature spaces for claimant and attorney, if both are included in the party participating in the funding transaction. A program can be written or adapted to amend the application, including adjusting the amount to which the discount is applied. Similarly, a program could also be written or adapted to automatedly send a message or communication as a function of the specific non-approval event and amendment to the application.

When the application review is complete and no non-approval events are discovered, the transaction may now go forward to approval 36. Certain transactions may be approved automatedly, without the need for approval by a person vested with approval authority by the entity. For example, transactions up to $25,000 may require only the approval of Rapid-Funds Operations, and this can be carried out by an automated approval. Transactions for higher funding (e.g., $25,000 to $75,000; 75,000 and greater) may require approval by persons so vested with such approval authority. Again, where additional approval is required, programs which are under the control of the vested persons can be written or adapted to make the approvals based on any criterion or criteria that they deem fit. In this way, the completed and review applications can be automatedly approved even where specific approval authority is required.

An approval worksheet or a comparable tracking program or record may be designed to track each stage of an approval process. The signature document or electronic data representation thereof can accompany the application approval worksheet in order for the transaction to go forward. An exemplary approval record or worksheet for approving advanced funding may be designed and executed as follows:

"Approval Worksheet
Funds Applied for
Client's proceeds_Total Settlement_Attorney's Fees_
Funded Amount_
_Application filled out correctly
_Signature of Attorney
_Signature of Client
_Attorney Standing Verified
_Signed Release included
_Lien Search Clear. If not, see number 7.
_If necessary, amendments are complete and signed.
_Entity [e.g., Rapid Funds Operations] Approval
_Approval by [responsible designate] (If above $25,000)
_Approval by [responsible designate] (If above $75,000)
_Approval by [responsible designate] (If above $250,000)

If there is no amendment upon discovering a non-approval event, the transaction is concluded 34 with no advance funding. Non-approval events that can cause a denial or discount of an advance funding transaction include:

Application is not accurately completed. This includes amendments made to the original agreement occasioned by changes in claimant status or liens attached upon the settlement.

Attorney is not currently in good standing with the bar in which he is admitted.

Signature authority is not granted on the application.

Claimant is legally incapacitated (e.g., an infant, incompetent, and/or deceased).

Obligated party is Carrier in Liquidation. (Payout would be discounted+60%)

If an application is denied, the entity (e.g., RapidFunds Operations) will immediately notify the party in writing by fax or electronic mail and post or courier. As before, the notification may be automated in the manner described herein. If available, an appeal process may be offered.

Once the application is approved 36, the funds may then be delivered to the party 38.

As has been described, the funding entity may in fact comprise any number of entities engaged in a relationship to offer or provide the advanced funds. For example, the entity could include an entity to facilitate and process settlements (e.g., the Settlement Center), an entity to engage and process advance funding invitations and applications (e.g.: Rapid-Funds Operations), and an entity that actually provides the funding (e.g., Cybersettle Financial Services or CFS Finance). In the present example, RapidFunds Operations will forward to CFS Finance the completed approval criteria worksheet or record along with all necessary approval signatures or comparable identity data. CFS Finance will review the worksheet and signatures. If materials are complete, CFS Finance will approve the issuance of funds check to the attorney. CFS finance will also oversee the delivery of the check via the means that the customer has chosen. Customer will have selected delivery option on the initial application. This delivery option will be noted on the Approval worksheet as well.

Funding 38 can be delivered any number of ways. A further advantage flowing, in part, from the on-line nature of the system is the ability to automatically provide immediate payment to a party being funded (e.g., a claimant or an attorney) or initiate an immediate transfer of the funding payment or value when an application is approved. The system shown in FIG. 5 is an exemplary simplified system variant that includes an interface to effectuate payment to the party automatedly, and can be implemented in any of the non-limiting embodiments and examples herein. For example, the interface may be to a payment card account system such that if funding is approved, and the party is a registered cardholder the party's credit/debit/charge/entertainment card is automatically credited with the funding amount. Similarly, if the party has a smart card, stored value card, online creditable purse or module, or other on-line accessible way for the recipient to (and preferably directly) receive the transfer automatedly, the system may be configured to automatically credit it with the funding amount. Given the numerous ways known to transfer or receive value on-line and the rate of growth in new ways to do so, it will be appreciated that the basic principle is the automatic provision or transfer of value, not the particular scrip, protocol or device used to do so.

Alternatively, the party may provide the system with an account number into which a wire transfer of the funds may be automatically transferred.

In some instances, the interface is merely a pre-configured vehicle for communicating with an authority in order to inform the authority that a transfer is to be made. As such, the system is capable of executing a transfer of any disbursement form chosen by a party. In this manner, suitable arrangements may be made so that the system can convert the funding into a non-monetary payment-in-kind or transfer. For example, through an arrangement with an airline frequent flyer program, or other program offering "points", the funds can be converted into the appropriate amount of miles or points. Alternatively, the funding may involve a non-monetary figure which can automatically initiate a transfer of stocks, bonds, commodities, precious metals, gems, etc., lodged with an escrow agent. In the event of approved funding, the appropriate amount is calculated as the funding value and automatically transferred to the party. For example, in the case of stocks, the shares will be automatically registered in the name of the party receiving the funds. In the case of precious metals, an account will be automatically opened in the party's name and a suitable amount will automatically be credited to that account. It will be recognized that, consistent with the description herein, automated funding would be extendible to apply to other payment-in-kind situations in a straightforward manner.

It may also be desirable to implement the system such that, in response to approval of funding, an automatic transfer of title or an ownership interest in something is initiated. In such a case, suitable documents authorizing the transfer will be executed but not filed. If a funding is approved, the system will automatically notify the appropriate entities and provide the necessary documents to effect the transfer with a minimum of the party's involvement.

Additionally variants may initiate issuance of some insurance product, such as an annuity or a fully paid up insurance policy in the funding amount.

The entity can record and track the funding transaction 40. This included tracking and recording the funds themselves, as well as the settlement proceeds and the correspondence attending the funding transaction. For example, CFS Finance can record the disbursement of funds. In addition, CFS Finance can also note receipt confirmation of receipt of mailing (i.e., return receipt, tracking confirmation). When the settlement proceeds are ultimately sent to CFS 44, CFS Finance will also record and analyze the results of the transaction, so that adjustments to discounts and process may be effectively undertaken.

CFS finance will confirm to RapidFunds Operations that funds have been sent to attorney. Upon notification, RapidFunds Operations can record the transaction and maintain contact with the party 42, beginning with a follow up call to the attorney according to the follow up schedule below.

Follow up calls will be tracked in a database, most likely Siebel. The first follow up call will be scheduled for five days prior to the median payment date in the case of carrier advances and ten days prior to median payment date with regard to governmental entity advances. The call itself should have the stated purpose of checking the status of settlement proceeds and determining any unanticipated delay in receipt. It is also meant to remind the attorney's office of the obligation to repay in a timely fashion. Barring definite information elicited in the first follow up, a second call is scheduled 15 days after the initial call (median+10 in the case of carrier advances, median+5 in the case of governmental entity advances.) Thereafter, follow-ups, barring specific information, may occur on a weekly basis until funds are received. In addition, RapidFunds Operations should also note receipt confirmation of receipt of mailing (i.e., return receipt, tracking confirmation).

The systems available to implement the method of recording tracking the funding transaction are capable of being fully automated to reduce or eliminate the need for human discretion. The systems available to implement the method of recording and tracking the funding transaction, as well as handling the transfer of settlement proceeds, are capable of being fully automated to reduce or eliminate the need for human discretion.

When the party that is funded, such as the attorney, receives settlement proceeds from the obligated party (e.g., the carrier) he or she will mail or automatedly transfer them to Cybersettle Financial Services. Also, the party that is funded could also agree to have the party that is obligated to pay the settlement proceeds (e.g., the respondent in a settled dispute between a claimant and a respondent) pay the proceeds directly to the entity. In this case, an automated transfer of settlement proceeds from the obligated party to the entity could be arranged.

Upon receipt, the entity, CFS finance, will deposit the settlement proceeds in an account, record receipt, and inform RapidFunds Operations that matter is closed 46. The proceeds may also be deposited into a designated account via the automated method and systems described. The RapidFunds Operations personnel will mark matter closed on tracking software (e.g., Siebel).

It should be understood that the above description is only representative of illustrative embodiments. For the convenience of the reader, the above description has focused on a limited number of representative samples of all possible embodiments, samples that teach the principles of the invention. The description has not attempted to exhaustively enumerate all possible variations or even combinations of those variations described. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments, involve differences in technology rather than differences in the application of the principles of the invention. It will be recognized that, based upon the description herein, most of the principles of the invention will be transferable to other specific technology for implementation purposes. This is particularly the case when the technology differences involve different specific hardware and/or software. Accordingly, the invention is not intended to be limited to less than the scope set forth in the following claims and equivalents.

As will be more fully appreciated from the above disclosure the figures and the claims appended hereto use of the system and method of the present invention allows simple, confidential resolution of claims between one or more plaintiffs and one or more defendants allowing the respective defendants to apportion the settlement according to each individual's perception of his or her potential risks and/or liability.

What is claimed is:

1. A computer executable method for dispute resolution between or among multiple parties, the method which when executed on a computer comprising: a) receiving at least one demand from each of one or more first parties for each claim of each first party; b) receiving at least one settlement offer from each of one or more second parties for all or a portion of each first party's claim; c) preventing disclosure of the demands to all second parties and preventing disclosure of each settlement offer to all first parties; d) calculating differences between the demands and the settlement offers in rounds, each of the differences being calculated using the settlement offers or offers corresponding to the demand or demands; e) calculating the percentage each settlement offer represents of the total settlement offered by each second party in that round for each corresponding demand; f) if the total settlement offer or offers corresponding to the demand or demands fall within at least one predetermined criterion including at least one criterion allowing for enabling a settlement when the demand is greater than the offer, calculating the percentage each second party will pay toward each corresponding demand, and transmitting a message to the parties that some or all of the claims are resolved; g) if the total settlement offers corresponding to the demand or demands do not fall within at least one predetermined criterion for any claims, transmitting a message to the parties that no claims have been resolved; and h) repeating the above steps on a round by round basis until at least one claim has been resolved or until the parties determine that no resolution can be achieved, wherein the computer automatedly executes each round in accord with the at least one predetermined criterion.

2. A method according to claim 1 wherein there is one first party and two or more second parties.

3. A method according to claim 2 wherein: (a) the first party submits one demand in the first round and each second party submits one settlement offer in the first round; (b) each settlement offer is calculated as a percentage of the amount each second party believes is the appropriate settlement amount for all second parties; (c) if the total settlement amount falls within a predetermined settlement criterion then, apportioning the total settlement between or among each second party according to the percentage that party's settlement proposal constitutes of its proportion of what it believes was the appropriate settlement amount for all second parties; or (d) if the total settlement amount does not fall within the predetermined criterion to produce a settlement, repeating steps (a) through (c) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

4. A method according to claim 2 wherein: (a) the first party submits two or three demands in the first round and each second party submits one settlement offer in the first round; (b) each settlement offer is calculated as a percentage of the amount each second party believes is the appropriate settlement amount for all second parties; (c) if the total settlement amount falls within a predetermined settlement criterion, apportioning the total settlement between or among each second party according to the percentage that party's settlement proposal constitutes of its proportion of what it believes was the appropriate settlement amount for all second parties; or (d) if the total settlement amount does not fall within the predetermined criterion to produce a settlement, repeating steps (a) through (c) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

5. A method according to claim 4 wherein the first party submits a demand and the three second parties each submit an offer representing what each believes its share is of the total value of the demand; each second party's offer is calculated as a percentage of what that party believes is the value of the demand; performing a calculation to determine if the aggregate of the second parties' offers falls with a predetermined criterion for resolution of the first party's demand; if that is the case, all parties are notified if a resolution has been achieved; each second party then pays a percentage of the total demand equivalent to the percentage its offer bore to the value that party assigned to its portion of the demand; if a complete resolution is not achieved, further rounds of demands and offers are conducted until: (i) a complete resolution is achieved; (ii) a predetermined number of rounds has been completed; or (iii) all parties decide not to participate further.

6. A method according to claim 2 wherein: (a) the first party submits one demand in the first round and each second party submits two or three settlement offers in the first round; (b) each settlement offer is calculated as a percentage of the amount each second party believes is the appropriate settlement amount for all second parties; (c) if the total settlement amount falls within a predetermined settlement criterion then, apportioning the total settlement between or among each second party according to the percentage that party's settlement proposal constitutes of its proportion of what it believes was the appropriate settlement amount for all second parties; or (d) if the total settlement amount does not fall within the predetermined criterion to produce a settlement, repeating steps (a) through (c) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

7. A method according to claim 6 wherein if one or two of the three parties decide not to participate further, the remaining parties can continue round by round to attempt to resolve the demand as it relates to that settlement party.

8. A method according to claim 2 wherein: (a) the first party submits two or three demands in the first round and each second party submits one settlement offer in the first round; (b) each settlement offer is calculated as a percentage of the amount each second party believes is the appropriate settlement amount for all second parties; (c) if the total settlement amount falls within a predetermined settlement criterion then, apportioning the total settlement between or among each second party according to the percentage that party's settlement proposal constitutes of its proportion of what it believes was the appropriate settlement amount for all second parties; or (d) if the total settlement amount does not fall within the predetermined criterion to produce a settlement, repeating steps (a) through (c) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

9. A method according to claim 2 wherein: (a) the first party submits one demand in the first round and each second party submits two or three settlement offers in the first round; (b) each settlement offer is calculated as a percentage of the amount each second party believes is the appropriate settlement amount for all second parties; (c) if the total settlement amount falls within a predetermined settlement criterion then, apportioning the total settlement between or among each second party according to the percentage that party's settlement proposal constitutes of its proportion of what it believes was the appropriate settlement amount for all second parties; or (d) if the total settlement amount does not fall within the predetermined criterion to produce a settlement, repeating steps (a) through (c) on a round by round basis using the same or a different predetermined criterion until a settlement is reached and communicated to the parties or until sufficient rounds are concluded until (i) a complete resolution of all demands is achieved, (ii) a predetermined number of rounds is completed or (iii) at least one party concludes no resolution can be achieved.

10. A method according to claim 1 wherein there are two or more first parties and one second party.

11. A method according to claim 10 wherein: (a) each first party submits one demand in the first round and the second party submits one settlement offer for each demand in the first round; (b) calculating the differences, if any, between each settlement offer and each corresponding demand to determine if any fall within a predetermined criterion; (c) any demand and offer which fall within a predetermined criterion result in a resolution of that demand; (d) if any demand and offer do not fall within a predetermined criterion such as to result in a resolution, repeating steps (a) through (c) on a round by round basis using the same or a different predetermined criterion until (i) a complete resolution of all demands is achieved, (ii) a predetermined number of rounds is completed, or (iii) at least one party concludes no resolution can be achieved.

12. A method according to claim 10 wherein: (a) each first party submits two or three demands in the first round and the second party submits one settlement offer to each first party in the first round; (b) calculating the differences, if any, between each settlement offer and each corresponding demand to determine if any fall within a predetermined criterion; (c) any demand and offer which fall within a predetermined criterion result in a resolution of that demand; (d) if any demand and offer do not fall within a predetermined criterion such as to result in a resolution repeating steps (a) through (c) on a round by round basis using the same or a different predetermined criterion until (i) a complete resolution of all demands is achieved, (ii) a predetermined number of rounds is completed, or (iii) at least one party concludes no resolution can be achieved.

13. A method according to claim 10 wherein: (a) each first party submits one demand in the first round and the second party submits two or three settlement offers for each demand in the first round; (b) calculating the differences, if any, between each settlement offer and each corresponding demand to determine if any fall within a predetermined criterion; (c) any demand and offer which fall within a predetermined criterion result in a resolution of that demand; (d) if any demand and offer do not fall within a predetermined criterion such as to result in a resolution, repeating steps (a) through (c) on a round by round basis using the same or a different predetermined criterion until (i) a complete resolution of all demands is achieved, (ii) a predetermined number of rounds is completed, or (iii) at least one party concludes no resolution can be achieved.

14. A method according to claim 1 wherein there are two or more first parties and two or more second parties.

15. A method according to claim 1 further comprising: a power round, wherein any party may request a power round which uses at least one criterion which is different from the criterion of the preceding round.

16. A method according to claim 1 wherein if a resolution is not reached as to all parties after a predetermined number of rounds, any party may request the issuance of a facilitating message to assist in resolution in the next round.

17. A method according to claim 1 further comprising: the step of transferring funds from each settlement offer or upon resolution of that party's claim to the party whose demand has been resolved.

18. A method according to claim 17 further comprising: the steps of notifying the party on whose behalf funds are transferred and notifying the party receiving said funds that the funds are being transferred to that party.

19. A method according to claim 17 wherein a fee is paid for the transfer of funds.

20. A method according to claim 17 wherein a fee is paid through a computer.

21. A method according to claim 17 wherein the funds transferred upon resolution are a discounted amount of the settlement offer upon which resolution was based.

22. A method according to claim 17 wherein the funds provided are in the form of an annuity.

23. A method according to claim 17 wherein the funds provided are in the form of a loan to the party or parties who owe the payment.

24. A method according to claim 23 which further comprises deducting a fee for providing the loan.

25. A method according to claim 1 wherein any first party can request a facilitator to assist in attempting to reach a partial or complete resolution.

26. A method according to claim 1 wherein any second party can request a facilitator to assist in attempting to reach a partial or complete resolution.

27. A method according to claim 1 wherein any one or more of the first parties and any one or more of the second parties can request a facilitator to assist in attempting to reach a partial or complete resolution.

28. A method according to claim 1 wherein any first party can request settlement by a specific mode of payment.

29. A method according to claim 1 wherein any second party can offer a specific mode of payment to settle the demand of any first party.

30. A method according to claim 1 wherein there is one first party and three second parties.

31. A method according to claim 1 comprising at least two rounds.

32. A method according to claim 1 conducted via the Internet.

33. A method according to claim 1 for the resolution of a class action wherein each first party is a plaintiff and submits at least one demand and each second party is a defendant and submits one settlement offer for each demand of each first party it desires to resolve, said method comprising at least one round.

34. A method according to claim 1 wherein the at least one demand is received before the at least one offer.

35. A method according to claim 1 wherein the at least one offer is received before the at least one demand.

36. A method according to claim 1 wherein each first party submits two or three demands before each second party submits any offer.

37. A method according to claim 1 wherein each second party submits two or three offers before each first party submits any demand.

38. A method according to claim 1 wherein one of the parties can specify a maximum number of rounds.

39. An automated system for resolving disputes between or among multiple parties which comprises: (a) input means for receiving at least one demand from each of one or more first parties for each claim of each first party and for receiving at least one settlement offer from each of one or more second parties for all or a portion of each first party's claim; (b) means for preventing disclosure of the demands of all second parties and preventing disclosure of the settlement offer to all first parties; (c) a processor for calculating the differences between the demands and settlement offers in rounds wherein each of the differences is calculated using the settlement offer or offers corresponding to the demand or demands, wherein said processor has at least one predetermined criterion including at least one criterion allowing for enabling a settlement when the demand is greater than the offer, which it applies to the demands and settlement offers; (d) means for calculating the percentage each settlement offer represents of the total settlement offered by each second party in that round for each corresponding demand; (e) said processor being configured to determine if the total settlement offer or offers corresponding to the demand or demands fall within the at least one predetermined criterion whereupon, if the total settlement offer or offers do, said processor is configured to calculate the percentage each second party will pay towards each corresponding demand and transmits a message at least one of the parties that some or all of the claims are resolved; (f) if the total settlement offers corresponding to the demand or the demands do not fall within at least one predetermined criteria for any claims, the means for transmitting is configured to transmit a message to at least one of the parties that no claim has been resolved; and (g) wherein said system is configured to repeat the above procedure on a round by round basis until at least one claim has been resolved or until the parties utilize input means to inform the system that no resolution can be achieved.

40. A system according to claim 39 which further comprises means whereby any party may request a power round which uses at least one criterion which is different from that used in the preceding round.

41. A system according to claim 39 further comprising input means by which any party may request a facilitating message be issued to assist in resolution in the next round.

42. A system according to claim 39 which further comprises means for transferring funds from each settlement offer or upon that party's resolution of its portion of the claim.

43. A system according to claim 42 further comprising means for paying a fee for the transfer of funds.

44. A system according to claim 42 wherein said means comprises a computer.

45. A system according to claim 42 wherein the means whereby the funds are transferred upon resolution discounts the amount of the settlement offer upon which resolution was based.

46. A system according to claim 42 wherein the means whereby the funds are provided makes the payment in the form of an annuity.

47. A system according to claim 42 wherein the means whereby the funds are provided makes the payment in form of a loan to the party or parties who owe payments.

48. A system according to claim 47 which further comprises means for deducting a fee for providing the loan and paying the fee to the payee.

49. A system according to claim 39 further comprising input means whereby the at least one first party can notify the at least one second party the manner in which payment should be made upon resolution of the at least one first party's claim.

50. A system according to claim 39 further comprising means whereby any first party can request settlement by a specific mode of payment.

51. A system according to claim 39 further comprising means whereby any second party can offer a specific mode of payment to settle the demand of any first party.

52. A system according to claim 39 connected to the Internet.

* * * * *